(12) United States Patent
Hamburg

(10) Patent No.: US 12,103,650 B2
(45) Date of Patent: Oct. 1, 2024

(54) UNDERWATER CUTTING DEVICE

(71) Applicant: SYSTEMS ANALYSIS & INTEGRATION, INC., Orange, CA (US)

(72) Inventor: Brian Fredrick Hamburg, Diamondhead, MS (US)

(73) Assignee: SYSTEMS ANALYSIS & INTEGRATION, INC., Orange, CA (US)

( * ) Notice: Subject to any disclaimer, the term of this patent is extended or adjusted under 35 U.S.C. 154(b) by 252 days.

(21) Appl. No.: 17/711,654

(22) Filed: Apr. 1, 2022

(65) Prior Publication Data

US 2022/0371708 A1 Nov. 24, 2022

Related U.S. Application Data

(60) Provisional application No. 63/191,677, filed on May 21, 2021.

(51) Int. Cl.
*B63C 11/52* (2006.01)
*B23D 35/00* (2006.01)
*H02G 1/10* (2006.01)
*H02G 1/00* (2006.01)
*H02G 1/16* (2006.01)

(52) U.S. Cl.
CPC ............ *B63C 11/52* (2013.01); *B23D 35/001* (2013.01); *H02G 1/005* (2013.01); *H02G 1/10* (2013.01); *H02G 1/16* (2013.01)

(58) Field of Classification Search
CPC ........... H02G 1/005; H02G 1/10; H02G 1/16; H02G 1/1214; H02G 1/1236; H02G 1/1295; H02G 1/1217; H02G 1/1229; Y10T 83/04; B23D 35/001
See application file for complete search history.

(56) References Cited

U.S. PATENT DOCUMENTS 3,848,334 A * 11/1974 Mattera ................ H01R 43/042
30/180
4,690,091 A * 9/1987 Persbeck .................... B63C 9/22
441/35
5,003,514 A * 3/1991 Cotilla ..................... G01S 3/801
367/4

(Continued)

FOREIGN PATENT DOCUMENTS

CA           3123983 A1 *  9/2021 ............. A01K 69/08
CN         113772055 A  * 12/2021
WO    WO-9425212 A1 * 11/1994 ........... B23D 15/145

*Primary Examiner* — Frederick L Lagman
(74) *Attorney, Agent, or Firm* — Knobbe, Martens, Olson & Bear, LLP

(57) ABSTRACT

A cutting device to sever a cable or the like. The cutting device can be used to sever the cable or the like in relatively inaccessible locations, such as in the ocean. The cutting device can include one or more springs that can be loaded to facilitate the deployment of a cutting tool to sever the cable or the like. The cutting device can include a lever than can be rotated between a locked configuration impeding deployment of the cutting tool and an unlocked configuration permitting deployment of the cutting tool. A linkage can retain the lever in the locked configuration. The linkage can be compromised, permitting the movement of the lever into the unlocked configuration.

21 Claims, 19 Drawing Sheets

(56) References Cited

U.S. PATENT DOCUMENTS

| | | | | |
|---|---|---|---|---|
| 6,397,948 B1* | 6/2002 | Williams | .............. | E21B 43/017 |
| | | | | 114/221 A |
| 6,878,024 B1* | 4/2005 | Kohuth | ................... | B63B 21/04 |
| | | | | 114/367 |
| 6,928,765 B2* | 8/2005 | Brickett | ................. | A01K 73/00 |
| | | | | 43/4 |
| 8,028,466 B1* | 10/2011 | Schrock | ................. | A01K 75/00 |
| | | | | 114/221 A |
| 11,749,977 B2* | 9/2023 | Frenken | .............. | G01R 21/006 |
| | | | | 83/13 |

* cited by examiner

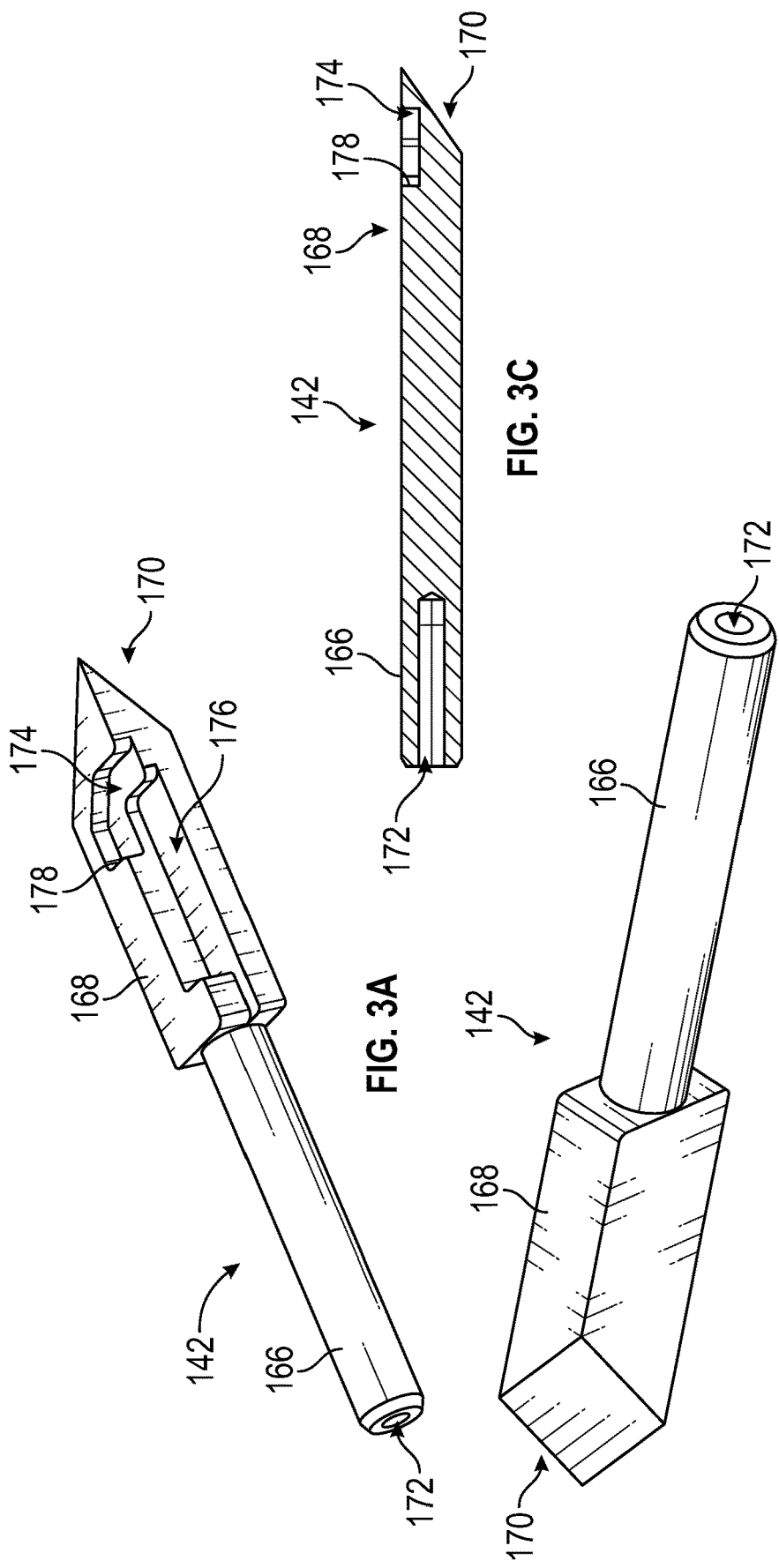

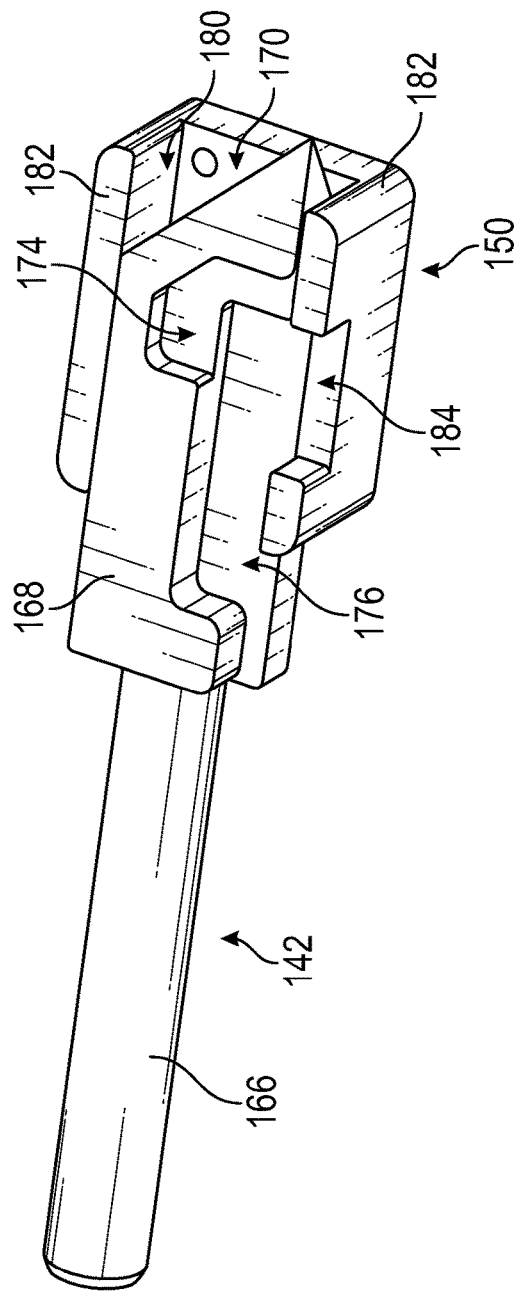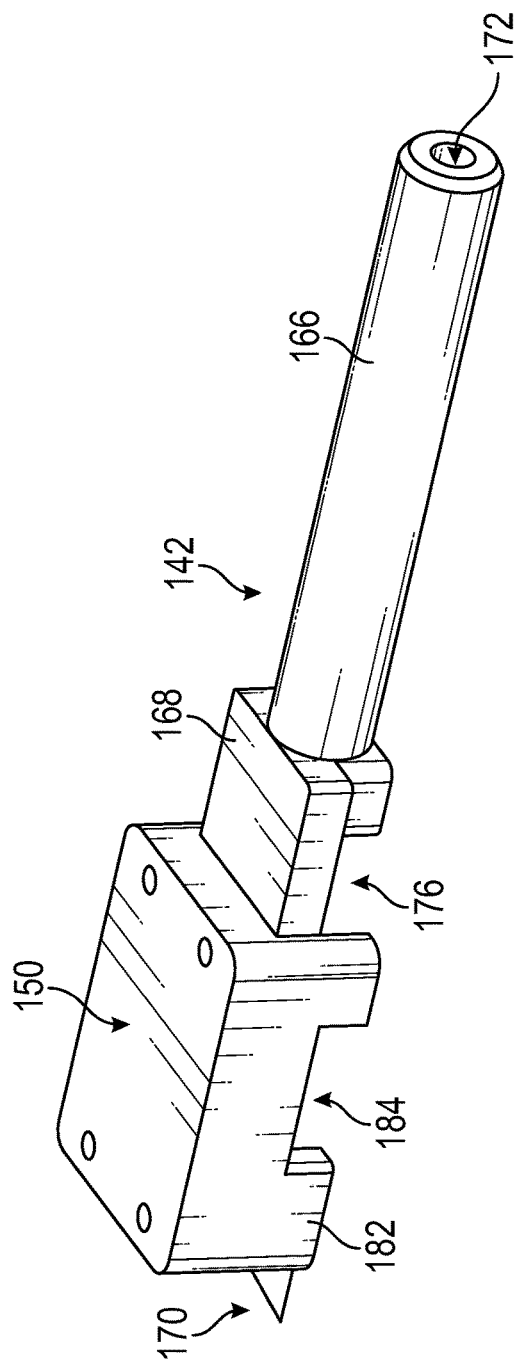
FIG. 5A
FIG. 5B

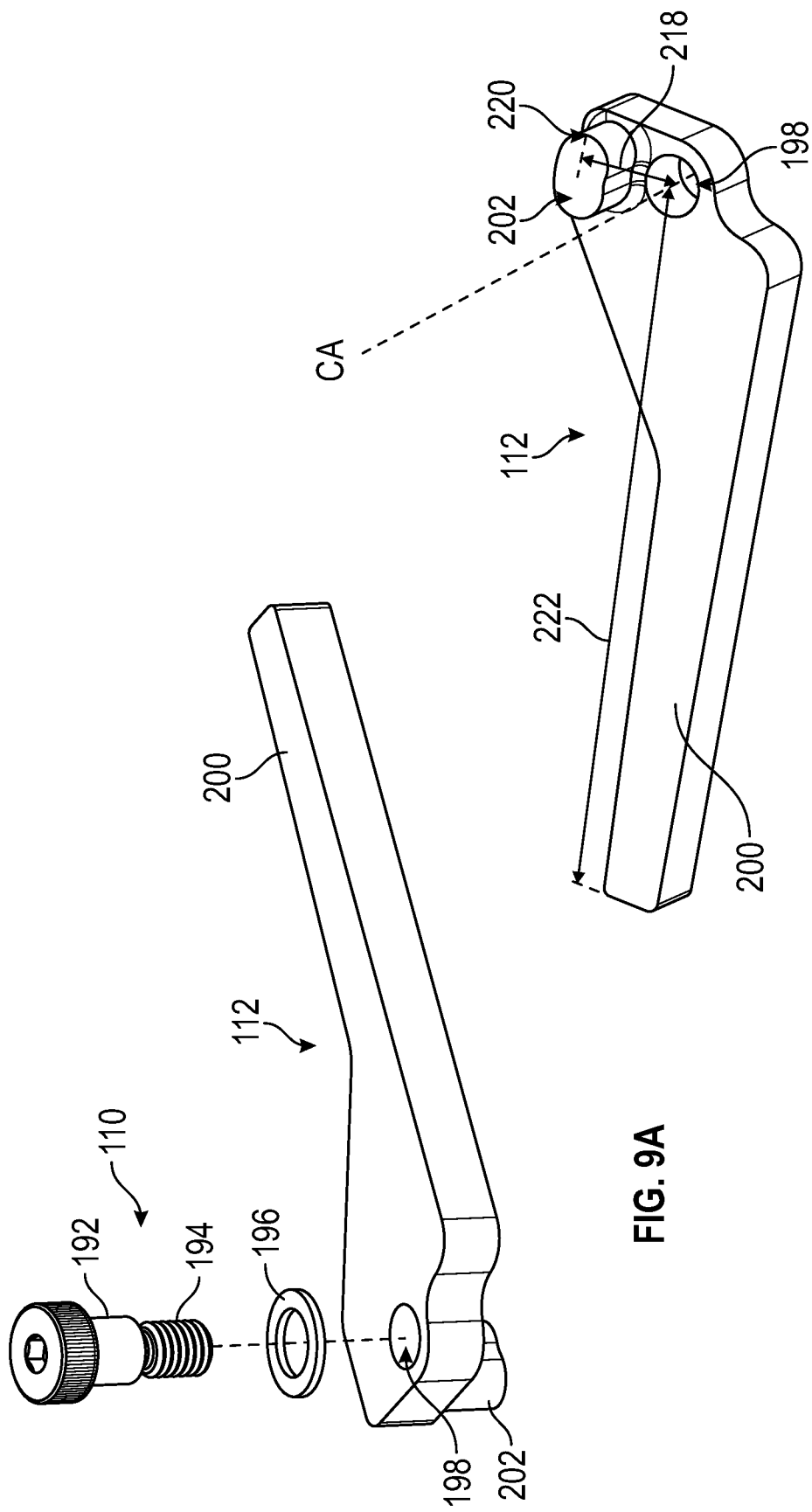

UNDERWATER CUTTING DEVICE

CROSS REFERENCE TO RELATED APPLICATIONS

This application claims priority to U.S. Provisional Patent Application No. 63/191,677, filed May 21, 2021, which is incorporated herein by reference in its entirety. Any and all applications, if any, for which a foreign or domestic priority claim is identified in the Application Data Sheet of the present application is hereby incorporated by reference under 37 CFR 1.57.

BACKGROUND

Cables and the like are used in numerous applications to tether or secure one or more items. It can be difficult, however, to quickly and reliably sever a cable or the like to quickly release the one or more items. In many instances, this can be due to the inaccessibility of the cable or the like. For example, a cable can be used to tether one or more items underwater proximate the ocean floor. It can be difficult to sever the cable to release the one or more items to float to the ocean surface for collection because the cable is located underwater and at an extreme depth.

SUMMARY

The systems and methods described herein each have several aspects, no single one of which is solely responsible for its desirable attributes. Without limiting the scope of this disclosure, several non-limiting features will now be discussed briefly.

In some variants, a device to sever a cable is disclosed herein. The device can include a housing that can have a peripheral wall and a hole that can receive the cable therethrough. The device can include a cutting tool disposed in the housing. The cutting tool can include a shaft and a head having a cutting edge that can sever the cable. The device can include one or more springs that can be disposed around the shaft. The device can include a bolt that can extend through the peripheral wall of the housing and into the shaft of the cutting tool to arm the device. The bolt can be rotated to pull the cutting tool to compress the one or more springs between the peripheral wall and the head of the cutting tool. The device can include a lever that can be moved between a locked configuration and an unlocked configuration. The lever can block movement of the cutting tool toward the hole in the locked configuration and can permit movement of the cutting tool toward the hole in the unlocked configuration. The device can include a link that can couple the lever to the housing to secure the lever in the locked configuration. The link can be compromised to allow the lever to be moved to the unlocked configuration to permit the cutting tool to move toward the hole.

In some variants, the guide block can be disposed in the housing. The guide block can include a central slot that can receive at least the head of the cutting tool. The guide block can facilitate sliding of the cutting tool during deployment and arming.

In some variants, the guide block can prevent rotation of the cutting tool during deployment and arming.

In some variants, the guide block can be made of plastic to promote sliding of the cutting tool.

In some variants, the device can include a stop block that can be disposed in the housing on an opposing side of the hole relative to the cutting tool. The cutting tool can deploy over the hole and into the stop block.

In some variants, the stop block can be made of plastic.

In some variants, the stop block can include an angled edge proximate the hole.

In some variants, the cutting edge can be angled.

In some variants, the cutting edge can be flat.

In some variants, the cutting edge can be angled and correspond to the angled edge of the stop block.

In some variants, the one or more springs can be helical springs with closed and ground ends.

In some variants, the one or more springs can include at least two springs positioned in series.

In some variants, the lever can be coupled to the housing with a fastener and pivot about the fastener between the locked and unlocked configurations.

In some variants, the fastener can be a shoulder screw.

In some variants, the device can include a thrust needle roller bearing that can facilitate rotation of the bolt.

In some variants, the device can include a flanged sleeve bearing that can be disposed in the peripheral wall of the housing. The bolt can extend through the flanged sleeve bearing.

In some variants, the lever can include a protrusion that can contact the cutting tool to block movement of the cutting tool toward the hole.

In some variants, the protrusion can contact the cutting tool at a contact point that is aligned with a central axis of the shaft.

In some variants, the housing can include a guide slot that can receive the protrusion therein such that the protrusion moves through the guide slot as the lever is rotated between the locked and unlocked configurations.

In some variants, the guide slot can be curved.

In some variants, the lever can rotate about a pivot that can be a first distance away from the protrusion. The one or more springs can push the cutting tool against the protrusion at the contact point to generate a first torque.

In some variants, the link can couple the lever to the housing at a location that is a second distance away from the pivot to generate a second torque that is equal and opposite to the first torque to prevent the lever from rotating from the locked configuration to the unlocked configuration.

In some variants, the lever can include stainless steel.

In some variants, a cutting device that can sever a cable is disclosed herein. The device can include a housing that can have an opening that can receive a cable therein. The device can include a blade disposed in the housing that can cut the cable received in the opening. The device can include one or more springs that can apply a force to the blade such that the blade deploys toward the opening to cut the cable. The device can include a screw that can extend through the housing and into the blade such that rotation of the screw moves the blade to compress the one or more springs between the blade and the housing. The device can include an arm that can block deployment of the blade toward the opening in a locked configuration and permit deployment of the blade toward the opening in an unlocked configuration. The device can include a fastener that can retain the arm in the locked configuration. The fastener can release the arm to allow the arm to be moved to the unlocked configuration to permit the blade to move toward the hole.

In some variants, the device can include a guide block that can be disposed in the housing. The guide block can have a central slot that can receive at least a portion of the blade. The guide block can facilitate sliding of the blade during deployment and arming.

In some variants, the guide block can prevent rotation of the cutting tool during deployment and arming.

In some variants, the guide block can be made of plastic to promote sliding of the cutting tool.

In some variants, the device can include a backstop block that can be disposed in the housing on an opposing side of the opening relative to the blade. The blade can deploy over the opening and into the backstop block.

In some variants, the backstop block can be made of plastic or fiberglass.

In some variants, the backstop block can include an angled edge proximate the opening.

In some variants, the blade can include a cutting edge that can be angled.

In some variants, the blade can include a cutting edge that can be flat.

In some variants, the blade can include a cutting edge that can be angled and correspond to the angled edge of the backstop block.

In some variants, the one or more springs can be helical springs with closed and ground ends.

In some variants, the one or more springs can include at least two springs positioned in series.

In some variants, the blade can include a shaft. The one or more springs can be disposed around the shaft.

In some variants, the arm can be coupled to the housing with a fastener and pivot about the fastener between the locked and unlocked configurations.

In some variants, the fastener can be a shoulder screw.

In some variants, the device can include a thrust needle roller bearing that can facilitate rotation of the screw.

In some variants, the device can include a flanged sleeve bearing that can be disposed in a wall of the housing. The screw can extend through the flanged sleeve bearing.

In some variants, the arm can include a protrusion that can contact the blade to block movement of the blade toward the opening.

In some variants, the protrusion can contact the blade at a contact point that is aligned with a central axis of the blade.

In some variants, the housing can include a guide slot that can receive the protrusion therein such that the protrusion moves through the guide slot as the arm is rotated between the locked and unlocked configurations.

In some variants, the guide slot can be curved.

In some variants, the arm can rotate about a pivot that is a first distance away from the protrusion. The one or more springs can push the blade against the protrusion at the contact point to generate a first torque.

In some variants, the fastener can couple the arm to the housing at a location that is a second distance away from the pivot to generate a second torque that is equal and opposite to the first torque to prevent the arm from rotating from the locked configuration to the unlocked configuration.

In some variants, the arm can be made of stainless steel.

In some variants, a cutting device that can sever a cable is disclosed herein. The device can include a housing that can have an opening that can receive a cable therein. The device can include a cutting tool that can be disposed in the housing that can cut the cable received in the opening. The device can include one or more springs that can apply a force to the cutting tool such that the cutting tool deploys toward the opening to cut the cable. The device can include a bolt that can extend through the housing and into the cutting tool such that rotation of the bolt moves the cutting tool to load (e.g., compress or tension) the one or more springs. The device can include an arm that can be moved between locked and unlocked configurations. The arm can block deployment of the cutting tool toward the opening in the locked configuration and permit deployment of the cutting tool toward the opening in the unlocked configuration. The device can include a linkage that can retain the arm in the locked configuration. The linkage can release the arm to allow the arm to be moved to the unlocked configuration to permit the cutting tool to move toward the opening.

In some variants, the device can include a guide block that can be disposed in the housing. The guide block can have a central slot that can receive at least a portion of the cutting tool. The guide block can facilitate sliding of the cutting tool during deployment and arming.

In some variants, the guide block can prevent rotation of the cutting tool during deployment and arming.

In some variants, the guide block can be made of plastic to promote sliding of the cutting tool.

In some variants, the device can include a backstop block disposed in the housing on an opposing side of the opening relative to the cutting tool. The cutting tool can deploy over the opening and into the backstop block.

In some variants, the backstop block can be made of plastic.

In some variants, the backstop block can include an angled edge proximate the opening.

In some variants, the cutting tool can include a cutting edge that is angled.

In some variants, the cutting tool can include a cutting edge that is flat.

In some variants, the cutting tool can include a cutting edge that is angled and corresponds to the angled edge of the backstop block.

In some variants, the one or more springs can be helical springs with closed and ground ends.

In some variants, the one or more springs can include at least two springs positioned in series.

In some variants, the cutting tool can include a shaft. The one or more springs can be disposed around the shaft.

In some variants, the arm can be coupled to the housing with a fastener and pivot about the fastener between the locked and unlocked configurations.

In some variants, the fastener can be a shoulder screw.

In some variants, the device can include a thrust needle roller bearing that can facilitate rotation of the bolt.

In some variants, the device can include a flanged sleeve bearing that can be disposed in a wall of the housing. The screw can extend through the flanged sleeve bearing.

In some variants, the arm can include a protrusion that can contact the cutting tool to block movement of the cutting tool toward the opening.

In some variants, the protrusion can contact the cutting tool at a contact point that is aligned with a central axis of the blade.

In some variants, the housing can include a guide slot that can receive the protrusion therein such that the protrusion moves through the guide slot as the arm is rotated between the locked and unlocked configurations.

In some variants, the guide slot can be curved.

In some variants, the arm can rotate about a pivot that is a first distance away from the protrusion. The one or more springs can push the cutting tool against the protrusion at the contact point to generate a first torque.

In some variants, the fastener can couple the arm to the housing at a location that is a second distance away from the pivot to generate a second torque that is equal and opposite to the first torque to prevent the arm from rotation from the locked configuration to the unlocked configuration.

In some variants, the arm can include stainless steel.

In some variants, a cutting device that can sever a cable is disclosed herein. The device can include a housing that can have an opening that can receive a cable therein. The device can include a cutting tool that can be disposed in the housing that can cut the cable received in the opening. The device can include one or more springs that can apply a force to the cutting edge such that the cutting tool deploys toward the opening to cut the cable. The device can include an arming mechanism that can load (e.g., compress or tension) the one or more springs. The device can include a locking mechanism that can be manipulated between a locked and unlocked configuration. The locking mechanism can block deployment of the cutting tool toward the opening in the locked configuration and permit deployment of the cutting tool toward the opening in the unlocked configuration. The device can include a linkage that can retain the locking mechanism in the locked configuration. The linkage can release the locking mechanism to permit the cutting tool to move toward the opening.

In some variants, a method of arming and deploying a cutting device is disclosed herein. The method can include inserting a cable into an opening of a housing. The method can include inserting an arming bolt through a peripheral wall of the housing and into a cutting tool. The method can include rotating the arming bolt to move the cutting tool into an armed positioned that loads (e.g., compress or tension) one or more springs. The method can include moving a lever into a locked configuration that blocks deployment of the cutting tool. The method can include coupling the lever to the housing with a linkage to retain the lever in the locked configuration. The method can include removing the arming bolt. The method can include compromising the linkage to permit the lever to move to an unlocked configuration and the cutting tool to deploy to cut the cable positioned in the opening of the housing.

In some variants, moving the lever into the locked configuration to block deployment of the cutting tool can include positioning a contact point of a protrusion of the lever against a contact surface of the cutting tool.

In some variants, the method can include moving the protrusion within a guide slot of the housing.

In some variants, rotating the arming bolt to move the cutting tool into an armed positioned that loads the one or more springs can include compressing the one or more springs between a head of the cutting tool and the peripheral wall of the housing.

In some variants, rotating the arming bolt to move the cutting tool into an armed positioned that loads the one or more springs can include pulling the one or more springs into tension.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIGS. 3A-3C illustrate an example cutting tool.

FIGS. 5A and 5B illustrate the cutting tool of FIGS. 3A-3C positioned in the guide block of FIGS. 4A and 4B.

FIG. 9A illustrates an example lever, washer, and fastener.

FIG. 9B illustrates the lever of FIG. 9A.

DETAILED DESCRIPTION OF SPECIFIC EMBODIMENTS

The foregoing aspects and many of the attendant advantages of this disclosure will become more readily appreciated as the same become better understood by reference to the following detailed description, when taken in conjunction with the accompanying drawings. While the following figures and description are often described herein with respect to underwater operation, the devices and methods described herein can be used in other applications, which include at least those described herein.

Figure 1A:
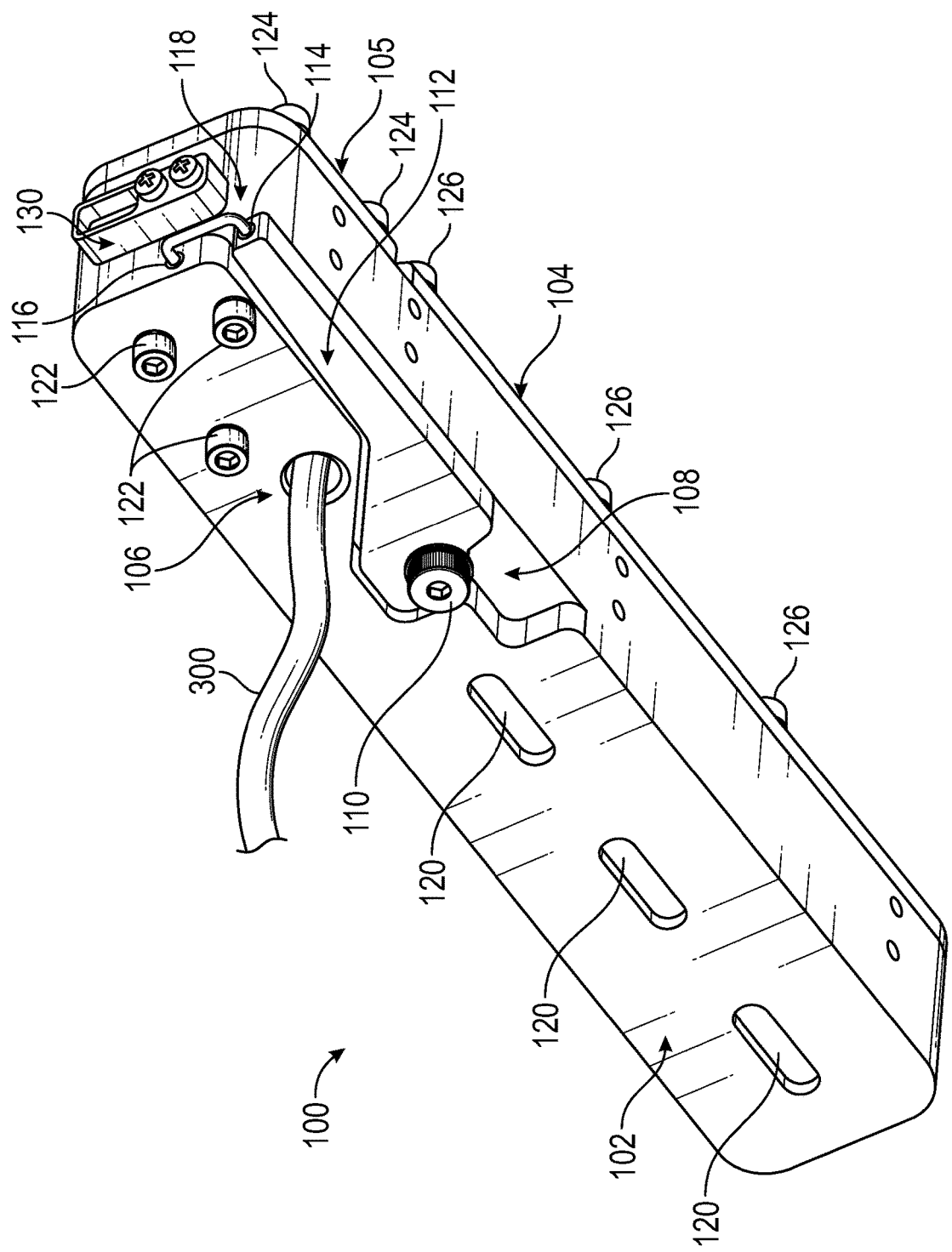
FIGS. 1A-1C illustrate various views of an example cutting device.
Figure 1B:
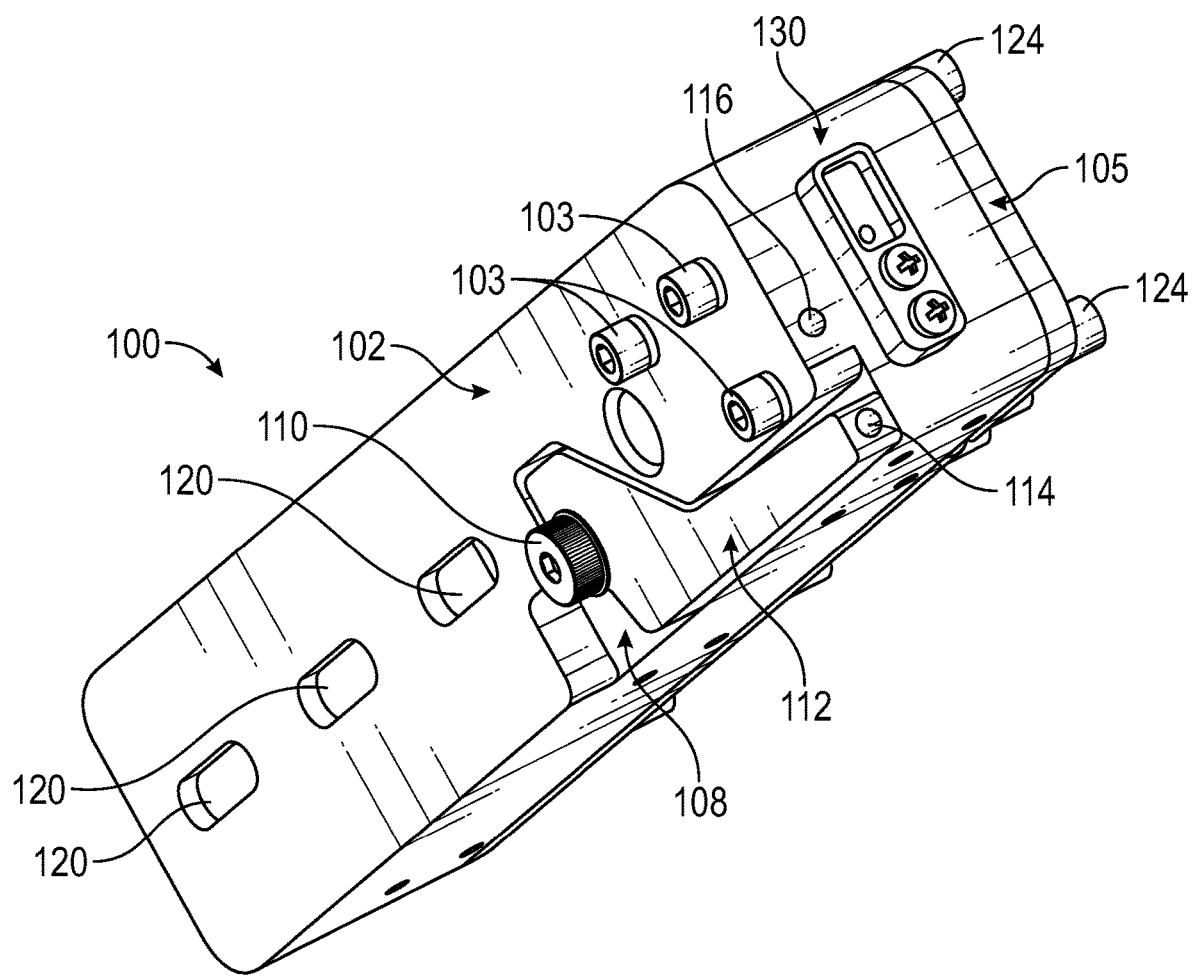
Figure 1C:
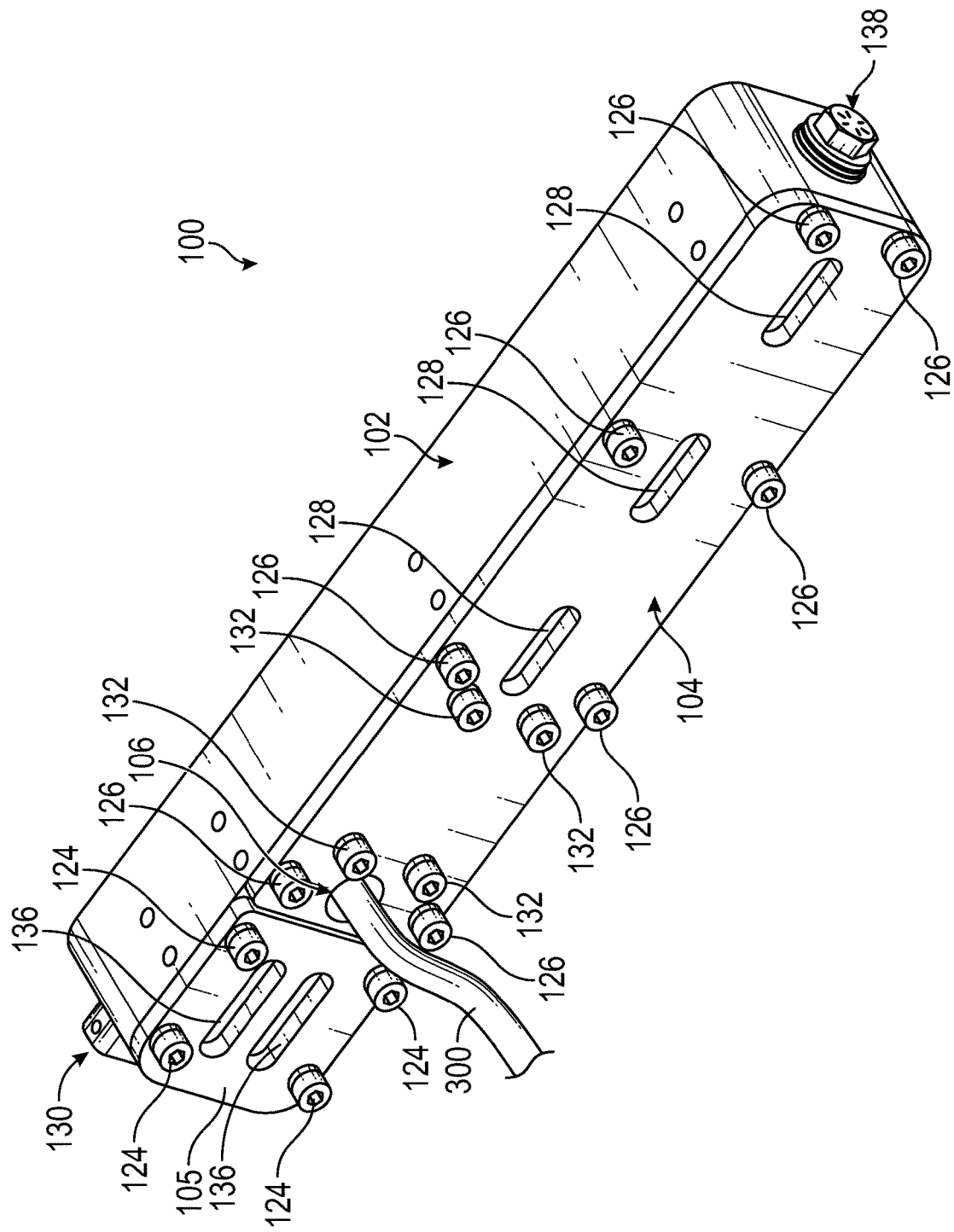

FIGS. 1A-1C illustrate a cutting device 100, which can also be referred to as a cutting assembly, cable cutter, severing device, or severing assembly. The cutting device 100 can be used to sever a cable 300 or the like (e.g., rope, cord, wire, chain, line, fibers, etc.). The cable 300 can be made of a variety of materials, such as metals, polymers, metal alloys, etc. In some variants, the cable 300 can be made of high strength synthetic material(s). In some variants, the cutting device 100 may be used to sever other items, such as a bolt, screw, link, etc. The cutting device 100 can be inexpensive, light, small, and/or have a low wet weight. The cutting device 100 can operate underwater or out of water. The cutting device 100 can be varying lengths, which can include at least about 13 inches. The cutting device 100 can be varying widths, which can include at least about 2.5 inches.

To place the cable 300 in a cutting position, the cable 300 can be placed through a hole 106 (e.g., opening) of the cutting device 100, as illustrated in FIG. 1A. The hole 106 can extend through the cutting device 100. For example, the hole 106 can pass through opposing sides of the cutting device 100. The hole 106 can be various shapes (e.g., circular, rectangular, irregular, etc.) and/or sizes. The size of the hole 106 can correspond to the size of the cable 300. For example, the hole 106 can be slightly larger than the outer periphery of the cable 300 to reduce movement of the cable 300 within the hole 106. In some variants, the size of the hole 106 can be changed to accommodate cables 300 of various sizes. For example, in some variants, the hole 106 can be defined by an insert that can changed to provide holes of various sizes. In some variants, the hole 106 can be a slot extending in from a periphery of the cutting device 100 to allow a cable 300 to be slide into the hole 106 from the periphery of the cutting device 100. The cable 300 can be locked within the slot via a locking arm.

The cutting device 100 can include a housing 102. The housing 102 can be various shapes (e.g., a rectangular prism) and/or sizes. The housing 102 can house a cutting tool and associated components that can be used to sever the cable 300. The housing 102 can include an open side. The open side can be covered by a first cover 104 and/or second cover 105, as illustrated in FIG. 1C, which can also be referred to as lids. The first cover 104 can be secured to the housing 102 with fastening bolts or screws 126. The second cover 105 can be secured to the housing 102 with fastening bolts or screws 124. In some variants, the first cover 104 and/or second cover 105 can be coupled to the housing 102 via a hinge. The hole 106 can extend through the first cover 104 and housing 102, such that a through hole extends through the cutting device 100.

In some variants, the first cover 104 can have one or more apertures 128 (e.g., two, three, etc.). The one or more apertures 128 can be used to verify the status of the cutting device 100 (e.g., whether the cutting mechanism is ready for deployment, e.g., armed, or has already been deployed). The one or more apertures 128 can allow water to flow in and out of the cutting device 100, which can reduce the flow resistance experienced by the cutting tool during firing. In some variants, the second cover 105 can include one or more apertures 136 (e.g., two, three, etc.). The one or more apertures 136 can be used to verify the status of a stop block (e.g., backstop, backstop block) positioned within the housing 102. The one or more apertures 136 can allow water to flow in and out of the cutting device 100, which can reduce the flow resistance experienced by the cutting tool during firing. As described herein, the cutting mechanism can deploy a cutting edge towards and/or into the stop block to sever the cable 300. In some variants, the cutting edge can break the stop block upon impact, which can be verified through the one or more apertures 136. Deploying the cutting tool past the hole 106 to break the stop block can ensure that a cable or the like in the hole 106 is completely severed.

In some variants, the cutting device 100 can include a guide block 150, described herein, that can guide movement of a cutting tool within the cutting device 100. The guide block can be secured to the first cover 104 with one or more fastening bolts 132.

The cutting device 100 can include an arming bolt 138, which can also be referred to as an arming mechanism, bolt, arming screw, or screw. The arming bolt 138 can be rotated to place a cutting tool within the cutting device 100 in an armed position (e.g., ready for deployment), which can include loading a spring. In some variants, the arming bolt 138 can be rotated manually or with a mechanism to arm the cutting device 100. In some variants, the arming bolt 138 can include a lever enabling an operator to manually arm the cutting device 100 without an additional tool. In some variants, a motor (e.g., electric motor) can move the cutting tool within the cutting device 100 to an armed configuration. In some variants, a multi-stage lever system can be used to move the cutting tool to an armed configuration, which can at least include a two or three stage lever system.

Returning to FIG. 1A, the cutting device 100 can include a lever 112, which can also be referred to as a locking mechanism, locking lever, arm, member, or bar, that can lock the cutting tool within the cutting device 100 in an armed position. The lever 112 can be rotated about a fastener 110 (e.g., shoulder screw, pivot, bolt, bolt with a standoff in the middle, etc.) to position the lever 112 in a locked position within a recess 108 of the housing 102, as illustrated in FIG. 1A. In some variants, the lever 112 can rotate about a protrusion (e.g., cylinder) extending from the housing 102. The lever 112 can be secured in the locked position via a link 118, which can also be referred to as a bar, linkage, clip, tie, clamp, fastener, etc. In some variants, the lever 112 can include a lever aperture 114. The housing 102 can include a housing aperture 116. The link 118 can extend into the lever aperture 114 and housing aperture 116 to secure the lever 112 in the locked position. With the link 118 securing the lever 112, the cutting device 100 may not sever the cable 300. In use, the operator can rotate the arming bolt 138 to move the cutting tool within the cutting device 100 to an armed position, which may include loading (e.g., compressing or tensioning) one or more springs. The lever 112 can then be rotated into the recess 108 to position the lever 112 in a locked position, as illustrated in FIG. 1A, to impede the deployment of the cutting tool within the cutting device 100. The link 118 can then couple the lever 112 to the housing 102 to secure the lever 112 in the locked position. The arming bolt 138 can then be removed. With the arming bolt 138 removed, the cutting tool can be deployed by removing, decoupling, splitting, breaking, corroding, disintegrating, melting, and/or otherwise compromising the link 118. The lever 112 can be rotated out of the recess 108 as the cutting tool moves toward and severs the cable 300 and, in some variants, breaks the stop block. In some variants, the lever 112 can be rotated out 90 degrees.

In some variants, the link 118 can be a corrosion link, which can corrode rapidly upon the application of an electrical current therethrough. For example, a voltage (e.g., 10 volts, 20 volts, 30 volts, etc.) can be applied to the link 118, resulting in its corrosion to allow the lever 112 to rotate out and the cutting tool to deploy to cut the cable 300 or the like. The link 118 can corrode to a sufficient level to release the lever 112 immediately or after 1, 2, 3, 5, 10, 20, 30, 60, 90, 120 or more seconds or any value between the foregoing values. Similarly, in some variants, the link 118 can be released from retaining the lever 112 by an acoustic release. In some variants, the link 118 can be the jaws of an acoustic release or a portion thereof. In some variants, the acoustic release can be commanded to open, via a signal, timer, program, etc., the jaws thereof to move the link 118 to release the lever 112 such that the cutting tool fires. In some variants, the link 118 can include a shape memory alloy that can be elongated, by exposure to an electrical current, to fracture a feature of the link 118 to release the lever 112 (e.g., a FRANGIBOLT®). In some variants, the link 118 can be a fastener (e.g., clamp, tie, etc.) that can release the lever 112 upon command. In some variants, the link 118 can be released with a pressure release. For example, if the cutting device 100 drops below a particular depth of water, the cutting device 100 can fire to cut the cable or the like. This can advantageously allow the cable device 100 to fire before the cable device 100 and/or the one or more items retained by the cable or the like implodes from excessive pressure.

Figure 1D:
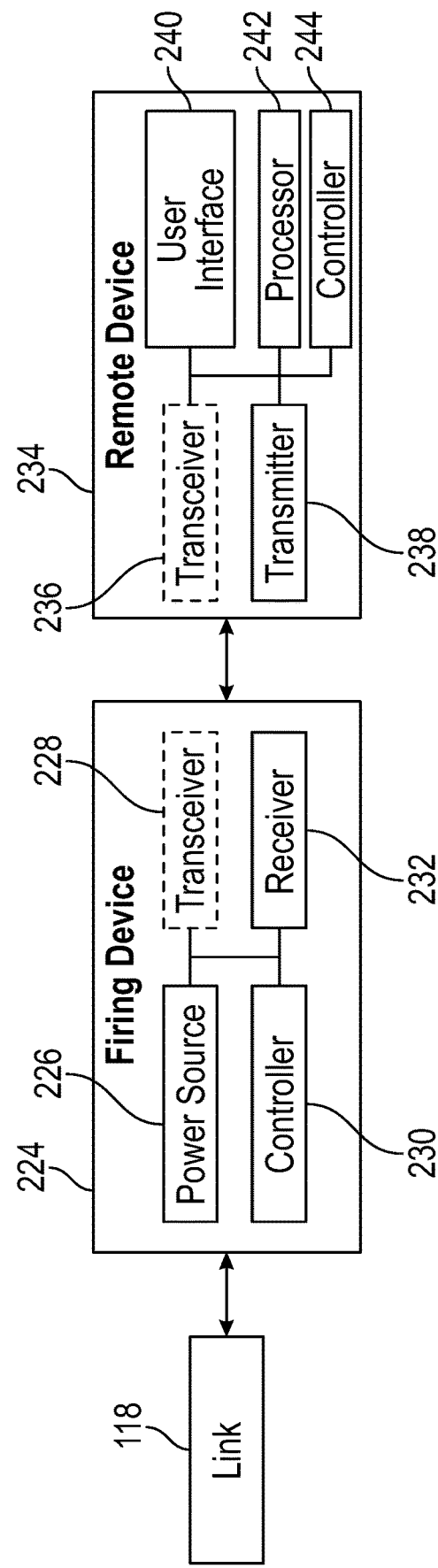
FIG. 1D illustrates a schematic of a device that can facilitate releasing a link to deploy a cutting tool of the cutting device.

FIG. 1D illustrates a schematic of an example firing device 224 (e.g., link release, deployment device, etc.). In some variants, the firing device 224 can be disposed on or in or proximate the cutting device 100. The firing device 224 can include a power source 226 (e.g., battery, wired power source, etc.), controller 230, and/or receiver 232. In some variants, the firing device 224 can include a processor, transmitter, transceiver 228, and/or other feature to facilitate the processes and/or methods described herein. The firing device 224 can be in communication (e.g., wired or wirelessly) with a remote device 234. The remote device 234 can include a transmitter 238, user interface 240, processor 242, and/or controller 244. In some variants, the remote device 234 can include a transceiver 236, receiver, and/or other features to facilitate the processes and/or methods described herein.

In operation, an operator or system can send a signal (e.g., wired or wirelessly) by way of the remote device 234 to the firing device 224 to release, break, and/or otherwise compromise the link 118. In some variants, the cutting device 100 can deploy the cutting tool (e.g., release, break, and/or otherwise compromise the link 118) as a result of a timer expiring, reaching a particular water depth, reaching a particular altitude, being exposed to a certain condition, and/or other programmable action(s). For example, the operator can interact with a user interface 240 to command that the cutting device 100 cut the cable or the like. The remote device 234 can communicate (e.g., send a signal), by way of the transmitter 238 or transceiver 236, to the firing device 224 a command to cut the cable or the like. The remote device 234 can receive the communication by way of the receiver 232 or transceiver 228. The firing device 224 can release, break, and/or otherwise compromise the link 118. With a corrosion link, the power source 226 can apply a current through the link 118, causing the link 118 to corrode such that the link 118 breaks from the force applied by the cutting tool so that the cutting tool deploys, which can include causing the lever to be rotated out. With a link 118 having a shape memory alloy portion, the power source 226 can apply a current to the link 118, causing the link 118 to expand and break to allow the cutting tool to deploy, which can include rotating out the lever. In some variants, the link 118 can be a fastener (e.g., clamp) that can be commanded by the firing device 224 to release the cutting tool and/or lever 112 to allow for the deployment of the cutting tool (e.g., acoustic release, as described herein), which can include rotating out the lever. In some variants, the transceiver 228 or transmitter of the firing device 224 can communicate with the remote device 234 to indicate the status of the firing device 224 (e.g., whether the firing device 224 has been fired or activated to release, break, and/or otherwise compromise the link 118).

Returning to FIG. 1A, the lever 112 can be made of a variety of materials. In some variants, stainless steel may be preferred for its resistance to salt water, strength properties, and/or ability to resist binding. In some variants, steel may be used. When the cutting device 100 uses high loads, an aluminum lever 112 may not be desirable because the lever 112 may flow (e.g., plastically deform) over time under a high load. However, an aluminum lever 112 may be used for a cutting device 100 using lower loads and/or intended for a short life span. In some variants, the geometry of an aluminum lever 112 may be changed (e.g., a protrusion described herein may be larger) to avoid flow such that an aluminum lever 112 may be used under high loads. In some variants, an aluminum lever 112 may be used under high loads by incorporating another material (e.g., stainless steel, brass, etc.) at a point of contact between the lever 112 and the cutting tool.

The housing 102 can include one or more apertures 120. The one or more apertures 120 can be used to verify the status of the cutting device 100 (e.g., whether the cutting device is armed for deployment, deployed, etc.). The one or more apertures 120 can allow water to flow in and out of the cutting device 100, which can reduce the flow resistance experienced by the cutting tool during firing. The stop block, described herein, can be secured to the housing 102 via a plurality of fastening bolts or screws 122 (e.g., two, three, four, etc.).

The cutting device 100 can include a seawater ground 130, as illustrated in FIG. 1B. The seawater ground 130 can be located on the cutting device 100 or closer to the firing device 224 (e.g., activating device). The seawater ground 130 may be used when the link 118 is a corrosion link that can be corroded rapidly upon the application of an electrical current therethrough. If other methods are used (e.g., breaking bolt, clamp release, pressure release, etc.), then the seawater ground 130 may not be used.

Figure 1E:
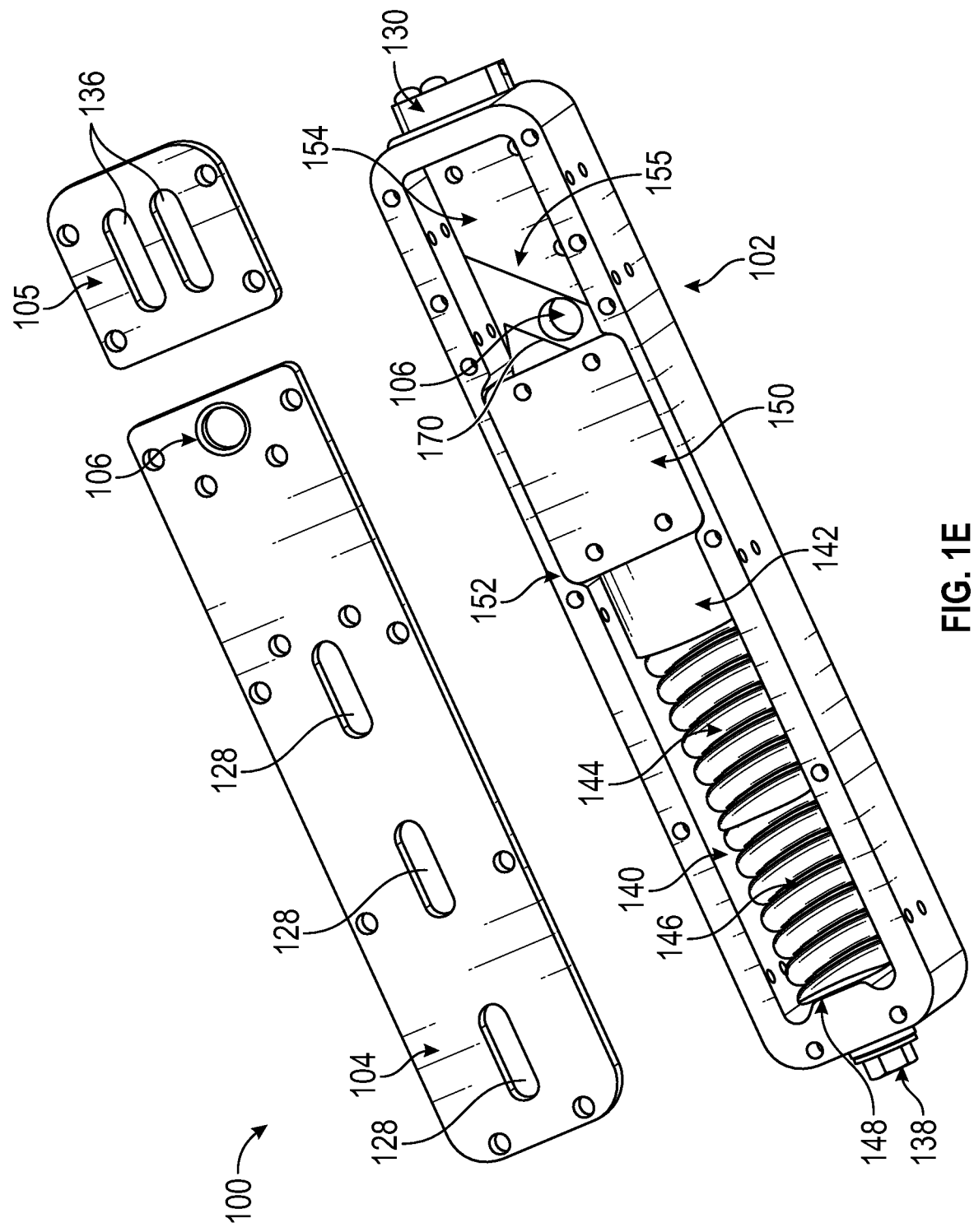
FIG. 1E illustrates the cutting device of FIGS. 1A-1C with covers removed, showing an interior of a housing of the cutting device.

FIG. 1E illustrates the cutting device 100 with the first cover 104 and second cover 105 removed to expose a cavity 140 within the housing 102. The cutting device 100 can include a cutting tool 142, which can also be referred to as a cutter, knife, knife tool, blade, or blade tool. The cutting tool 142 can be disposed in the cavity. The cutting tool 142 can include a cutting edge 170, which can be positioned proximate the hole 106. The cutting tool 142 can be deployed for cutting with the force provided by a spring 144 and/or spring 146. In some variants, a single spring my provide the deployment force for cutting. The spring 144 and/or spring 146 can apply a variety of initial forces to the cutting tool 142, which can at least include less than 1000, 1000, 2000, 3000 or more pounds of force or any value between the foregoing values. The spring 144 and/or spring 146 can be placed in series. In some variants, the spring 144 and/or spring 146 can be compression springs. In some variants, the spring 144 and/or spring 146 can be helical springs with closed and ground ends. In some variants, the spring 144 and/or spring 146 can be tension springs that are pulled into tension to provide a pulling force to deploy the cutting tool 142. As illustrated, the cutting tool 142 has been pulled toward a contact surface 148 of a peripheral wall of the housing 102 by the arming bolt 138 to compress and load the spring 144 and/or spring 146. When tension springs are used, a spring can be coupled to either side of the cutting tool 142 on opposing sides of the hole 106. The tension springs can be pulled into tension and the cutting device 100 can operate as described herein.

The cutting device 100 can include a guide block 150, which can also be referred to as a guide insert, glide block, slide bearing, or glide insert. The guide block 150 can be disposed within an enlarged portion 152 of the cavity 140 of the housing 102. The enlarged portion 152 can help to prevent movement of the guide block 150. A portion of the cutting tool 142 can be positioned within the guide block 150. The guide block 150 can help to prevent the cutting tool 142 from binding, hitting the sides of the housing 102, floating too high within the housing 102, etc. during deployment or arming of the cutting tool 142. The guide block 150 can help to prevent the cutting tool 142 from rotating as the arming bolt 138 is rotated to maneuver the cutting tool 142 into an armed configuration. The guide block 150 can guide the cutting tool 142 during deployment and/or arming. The guide block 150 can be a slide bearing for the cutting tool 142. In some variants, the guide block 150 can be made of a polymer, such as plastic.

As described herein, the cutting device 100 can include a stop block 154, which can also be referred to as a back stop. The stop block 154 can be disposed within the cavity 140 of the housing 102. The stop block 154 can be disposed on an opposite side of the hole 106 relative to the cutting tool 142. The stop block 154 can include an angled edge 155, which can be proximate the hole 106. The angled edge 155 can be complementary to the cutting edge 170 (e.g., be the same or similar angle). As described herein, with the arming bolt 138 removed, the cutting tool 142 can be deployed. The spring 146 and/or spring 144 can apply a force to the cutting tool 142 moving the cutting edge 170 toward the cable 300 positioned through the hole 106 and rotating the lever 112 out of the recess 108. The cutting edge 170 can at least move from one side of the hole 106 to the other to sever the cable 300. In some variants, the cutting edge 170 can impact and/or move into the stop block 154. In some variants, the spring 144 and/or spring 146 can apply less than 500, 500, 750, 1000, 1250, 1500 or more pounds of force to the cutting tool 142 as the cutting tool 142 impacts the stop block 154.

Figure 2A:
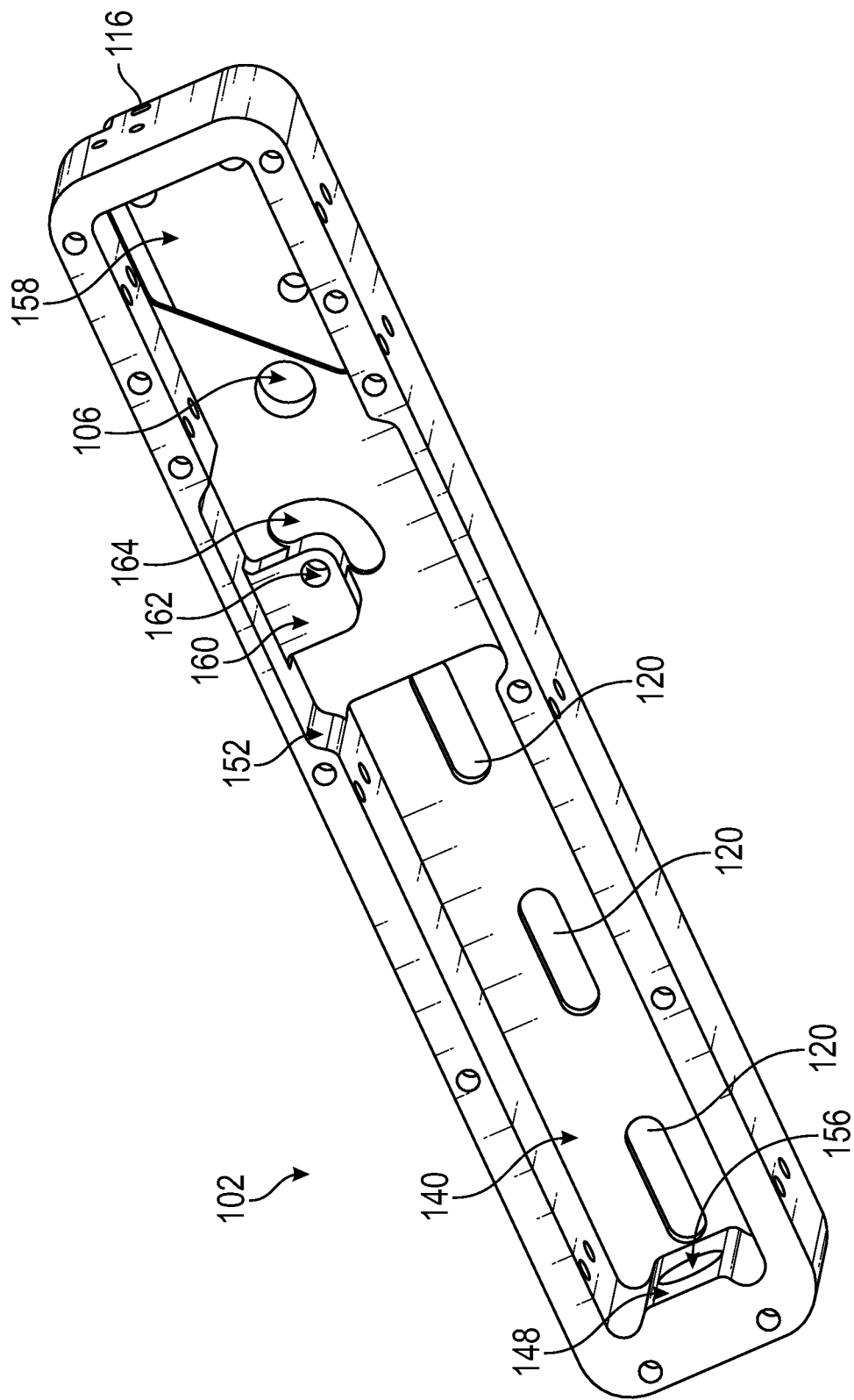
FIGS. 2A and 2B illustrate an example housing.
Figure 2B:
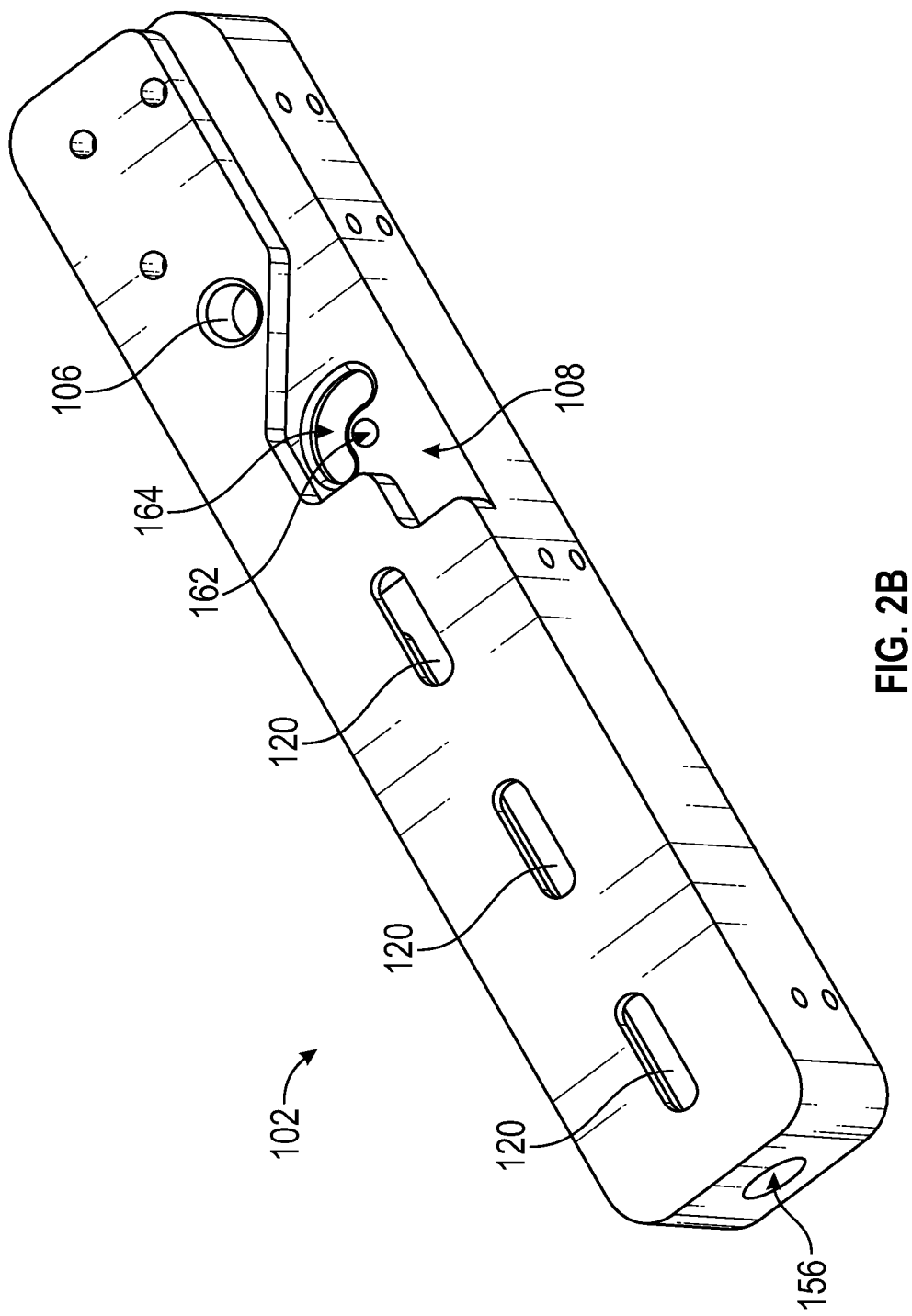

FIGS. 2A and 2B illustrate the housing 102. FIG. 2A illustrates the empty cavity 140 of the housing 102. The housing 102 can include a tab 160, which can also be referred to as a projection. The tab 160 can extend from the peripheral wall of the housing 102 into the cavity 140. The tab 160 can be positioned into a gap of the guide block 150 when the guide block 150 is disposed in the enlarged portion 152 of the cavity 140. The enlarged portion 152 can be defined by recesses and/or grooves in the peripheral wall of the housing 102. The enlarged portion 152 can provide clearance for the guide block 150. In some variants, an enlarged portion 152 is not included, such as with a narrower cutting tool 142 or wider housing 102. The tab 160 can help to prevent movement of the guide block 150 when the guide block 150 is disposed in the cavity 140, which can include the enlarged portion 152. An aperture 162 can extend through the tab 160. The fastener 110 (e.g., shoulder screw) can be disposed into the aperture 162 to secure the lever 112 to the housing 102. In some variants, the aperture 162 can be threaded. The threaded portion of the fastener 110 can be inserted into the aperture 162 such that a smooth portion of the fastener 110 extends out of the housing 102. The tab 160 can provide enough thread engagement for the fastener 110 to be threaded therein. The lever 112 can be rotated about the smooth portion of the fastener 110. In some variants, the lever 112 can pivot about a protrusion (e.g., cylinder) extending from the housing 102.

The housing 102 can include a guide slot 164, which can also be referred to as a slot, channel, guide channel, or guide hole. A protrusion of the lever 112 can extend into the guide slot 164 such that the protrusion moves within the guide slot 164 as the lever 112 is rotated from a locked to unlocked position. The guide slot 164 can guide movement of the lever 112. The guide slot 164 can include a width that is slightly larger than a width of the protrusion of the lever 112. The guide slot 164 can be a curved slot. The guide slot 164 can curve around the aperture 162. The guide slot 164 can curve around the tab 160. The guide slot 164 can include curved ends.

The housing 102 can include a recess 158. The recess 158 can be disposed within the cavity 140. The recess 158 can receive the stop block 154 therein. The recess 158 can have a shape corresponding to the shape of the stop block 154. The recess 158 can help to secure the stop block 154 within the cavity 140.

The housing 102 can include a contact surface 148. The contact surface 148 can be a portion of the peripheral wall of the housing 102. The contact surface 148 can be an internal raised portion of the peripheral wall of the housing 102. The spring 146 can contact the contact surface 148. In some variants, the spring 146 and/or spring 144 can be compressed between the cutting tool 142 and the contact surface 148 to load the spring 146 and/or spring 144. In some variants, a shaft of the cutting tool 142 can contact the contact surface 148 when placed in the armed configuration with the spring 146 and/or spring 144 loaded. The contact surface 148 can be flat.

The housing 102 can include a hole 156. The arming bolt 138 can extend through the hole 156 and into the cavity 140. The arming bolt 138 can be inserted into a hole, which can be threaded, of the cutting tool 142 such that the cutting tool 142 is moved toward the contact surface 148 as the arming bolt 138 is rotated. The contact surface 148 can be disposed around the hole 156.

The housing 102 can include a recess 108, as illustrated in FIG. 2B. The recess 108 can be outside of the cavity 140. The recess 108 can receive the lever 112. The aperture 162 can extend into the recess 108. The guide slot 164 can extend into the recess 108. In the locked configuration, an arm of the lever 112 can be rotated into the recess 108. In an unlocked configuration, the arm of the lever 112 can be rotated out of the recess 108. The recess 108 can decrease the overall size of the cutting device 100 by housing the lever 112 in the locked configuration. In some variants, the housing 102 does not include a recess 108.

FIGS. 3A-3C illustrate the cutting tool 142, which can also be referred to as the cutter, knife, knife tool, blade, or blade tool. The cutting tool 142 can include a shaft 166. As illustrated in FIG. 1E, the spring 146 and/or spring 144 can be positioned around the shaft 166. In some variants, the periphery of the shaft 166 can be similar in size and/or shape to the inner periphery of the spring 146 and/or spring 144 in unloaded configurations. Returning to FIGS. 3A-3C, the cutting tool 142 can include a hole 172. The hole 172 can be disposed in the shaft 166. The hole 172 can be threaded for engagement with the arming bolt 138 such that rotation of the arming bolt 138 moves the cutting tool 142 towards or away from the contact surface 148. The depth or length of the hole 172 or threaded portion thereof and/or the length of the arming bolt 138 or threaded portion thereof can be long enough such that the arming bolt 138 can be inserted within the hole 172 from outside the housing 102 and rotated (advancing the arming bolt 138 within the hole 172) to move the cutting tool 142 from a deployed position (e.g., past the hole 106 and/or into the stop block 154) to an armed configuration, which may place the end of the shaft 166 proximate the contact surface 148. In some variants, the length of the hole 172 or threaded portion thereof can be the same as or longer than the distance between the cutting edge 170 of the cutting tool 142 in the fully retracted armed configuration and the angled edge 155 of the stop block 154 or a position more inward on the stop block 154 that is past the angled edge 155 to ensure the cutting tool 142 can be moved to clear the hole 106.

The cutting tool 142 can include a head 168. The head 168 can be disposed on an end of the shaft 166. The cutting tool 142 can include a recess 174. The recess 174 can be positioned proximate the guide slot 164 of the housing 102 such that the protrusion of the lever 112 positioned through the guide slot 164 can move within the recess 174 as the lever 112 is rotated between the locked and unlocked configurations. A contact surface 178 can be disposed at an end of the recess 174. The protrusion of the lever 112 can contact the contact surface 178 to impede the deployment of the cutting tool 142 (e.g., prevent the spring 146 and/or spring 144 from deploying the cutting tool 142 to sever the cable 300). When the link 118 is not maintaining the position of the lever 112, the cutting tool 142 can deploy such that the contact surface 178 pushes the protrusion of the lever 112 positioned within the recess 174, which can rotate the lever 112 out of the recess 108, as the cutting tool 142 moves to sever the cable 300. The recess 174 can be disposed in the head 168 of the cutting tool 142.

The cutting tool 142 can include a tab slot 176. The cutting tool 142 can be positioned within the cavity 140 of the housing 102 such that tab 160 of the housing 102 is positioned within the tab slot 176. The tab 160 can be positioned within the tab slot 176 as the cutting tool 142 moves between the stowed and deployed configurations. The tab slot 176 can enable the cutting tool 142 to translate within the cutting device 100 without the tab 160 impeding movement. A longitudinal length of the tab slot 176 can be oriented in the direction of movement of the cutting tool 142. The tab slot 176 can be disposed in the head 168 of the cutting tool 142.

The cutting tool 142 can include a cutting edge 170, which can also be referred to as a blade. The cutting edge 170 can be a guillotine style blade. The cutting edge 170 can be angled. In some variants, the cutting edge 170 can be curved. In some variants, the cutting edge 170 can be straight or flat, which can require more cutting force than the guillotine style blade. In some variants, the cutting edge 170 can be v-shaped. An angled or guillotine style blade can, in some instances, more efficiently cut a cable or the like. The cutting tool 142 and/or portions thereof can be made of a variety of materials, as described herein, which can include high strength aluminum. The material of the cutting tool 142 may vary upon the material of the cable or the like to be cut. The cutting tool 142 can be used more than once to cut multiple cables or the like.

Figure 4A:
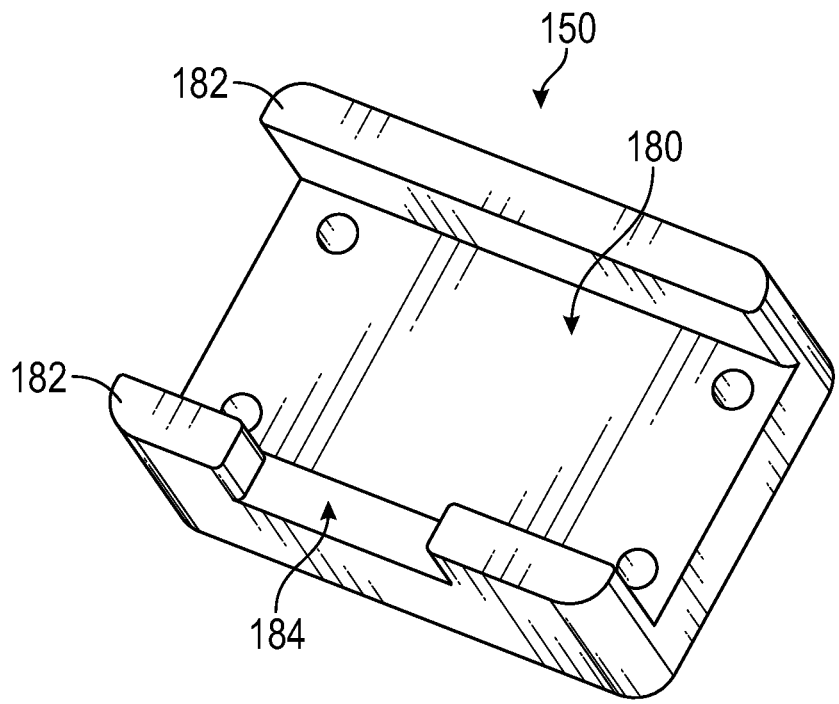
FIGS. 4A and 4B illustrate an example guide block.
Figure 4B:
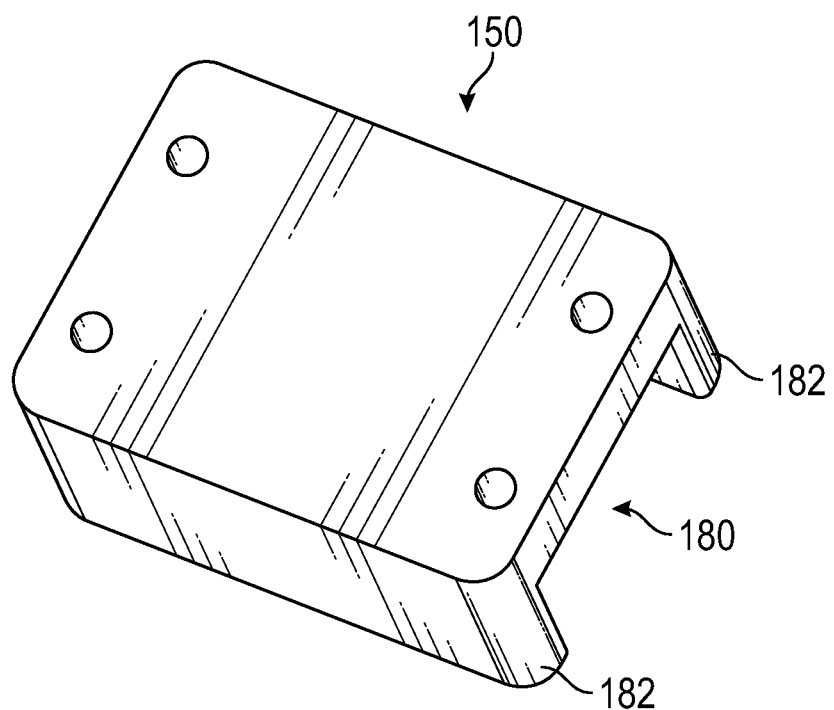

FIGS. 4A and 4B illustrate the guide block 150, which can also be referred to as guide insert, glide block, or glide insert. The guide block 150 can include a central slot 180 to receive the cutting tool 142 therein. The guide block 150 can enable the cutting tool 142 to smoothly slide to cut the cable or the like and/or arm the cutting device 100. The guide block 150 can prevent the cutting tool 142 from hitting the sides of the housing 102. The guide block 150 can prevent the cutting tool 142 from rotating during deployment for cutting and/or as the arming bolt 138 rotates to move the cutting tool 142 into an armed position. The guide block 150 can include opposing walls 182. The opposing walls 182 can be positioned on opposing sides of the central slot 180. The opposing walls 182 can prevent the cutting tool 142 from hitting the sides of the housing 102. One of the opposing walls 182 can include a gap 184 therein. The gap 184 can be positioned over the tab 160 of the housing 102 to help secure the guide block 150 within the cavity 140 of the housing 102. The guide block 150 can be made of a variety of materials which can include a polymer (e.g., plastic).

FIGS. 5A and 5B illustrate the cutting tool 142 positioned within the guide block 150. The cutting tool 142 (e.g., the head 168) can be positioned within the central slot 180 of the guide block 150. During cutting and/or arming, the cutting tool 142 can slide within the central slot 180. As described herein, the guide block 150 can help to prevent the cutting tool 142 from rotating as the arming bolt 138 rotates to move the cutting tool 142. The cutting tool 142 can be oriented within the guide block 150 such that the recess 174 and tab slot 176 face away from the guide block 150. The cutting tool 142 and guide block 150 can be positioned within the housing 102 such that the cutting tool 142 is positioned between the guide block 150 and a surface of the housing 102.

Figure 6:
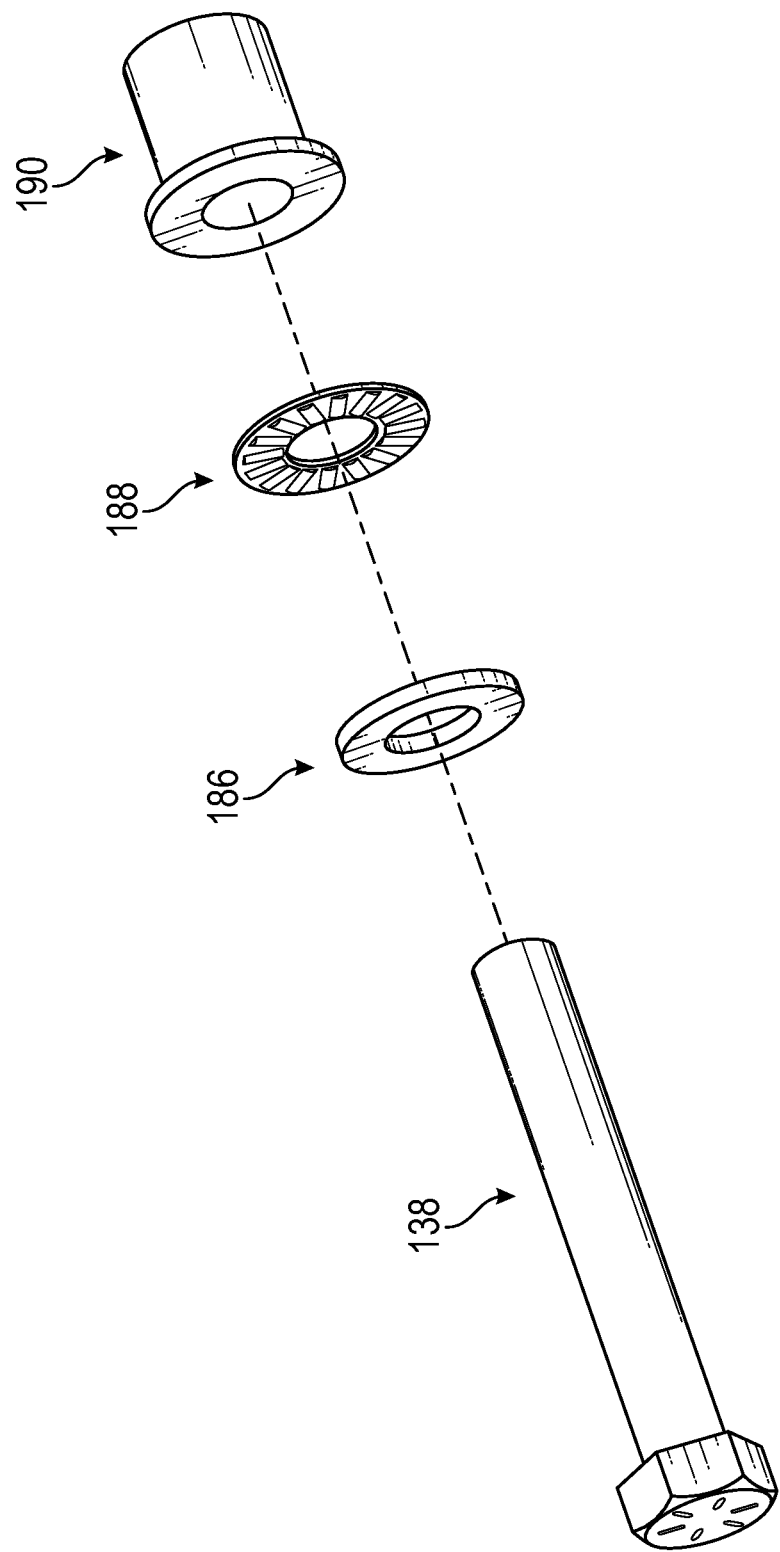
FIG. 6 illustrates an example arming bolt, washer, thrust needle roller bearing, and flanged sleeve bearing.

FIG. 6 illustrates the arming bolt 138 and associated components. A flanged sleeve bearing 190 can be positioned within the hole 156 of the housing 102 to enable the arming bolt 138 to be rotated therein. A thrust needle roller bearing 188 and/or washer 186 can be positioned between the flange of the flanged sleeve bearing 190 and the head of the arming bolt 138 to facilitate rotation of the arming bolt 138 to move the cutting tool 142. In some variants, the arming bolt 138 can be inserted into the hole 156 without the flanged sleeve bearing 190, washer 186, and/or thrust needle roller bearing 188. As described herein, the arming bolt 138 can be threaded such that rotation thereof, when inserted into the hole 172 of the cutting tool 142, can move the cutting tool 142 within the cutting device 100. In some variants, another bearing, other than the thrust needle roller bearing 188, can be used to facilitate rotation of the arming bolt 138.

Figure 7:
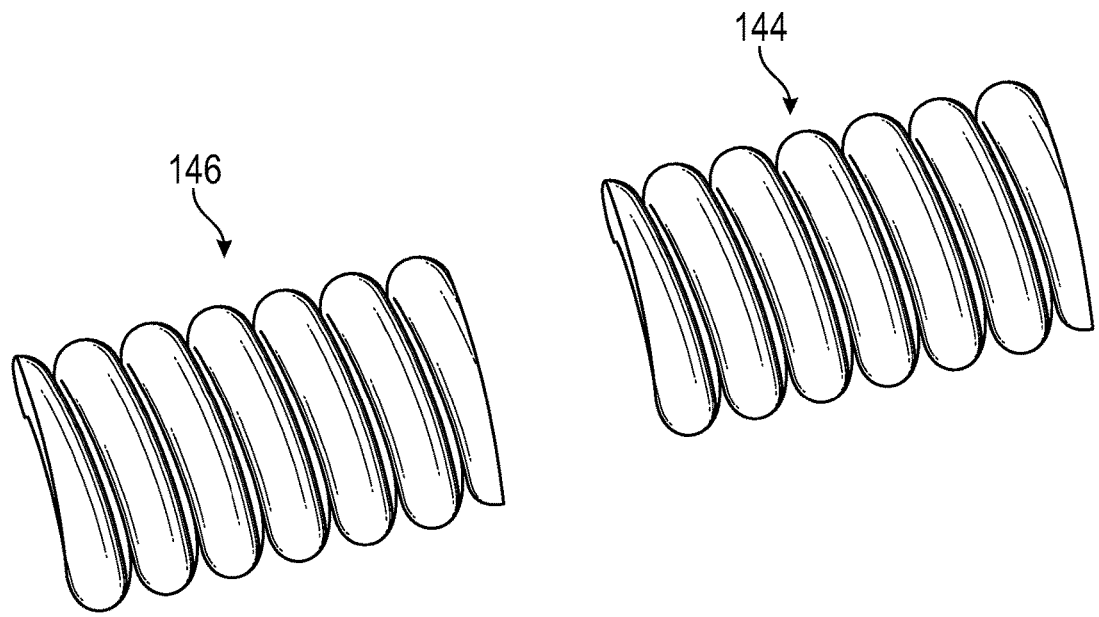
FIG. 7 illustrates example springs.

FIG. 7 illustrates the spring 144 and/or spring 146. As described herein, the spring 144 and/or spring 146 can apply a force, which can include tension or compression, to move the cutting tool 142 to cut the cable or the like. In some variants, only one spring is used. In some variants, more than two springs can be used. The spring 144 and/or spring 146 can be placed in series. In some variants, the spring 144 and/or spring 146 can be helical springs with closed and ground ends.

Figure 8:
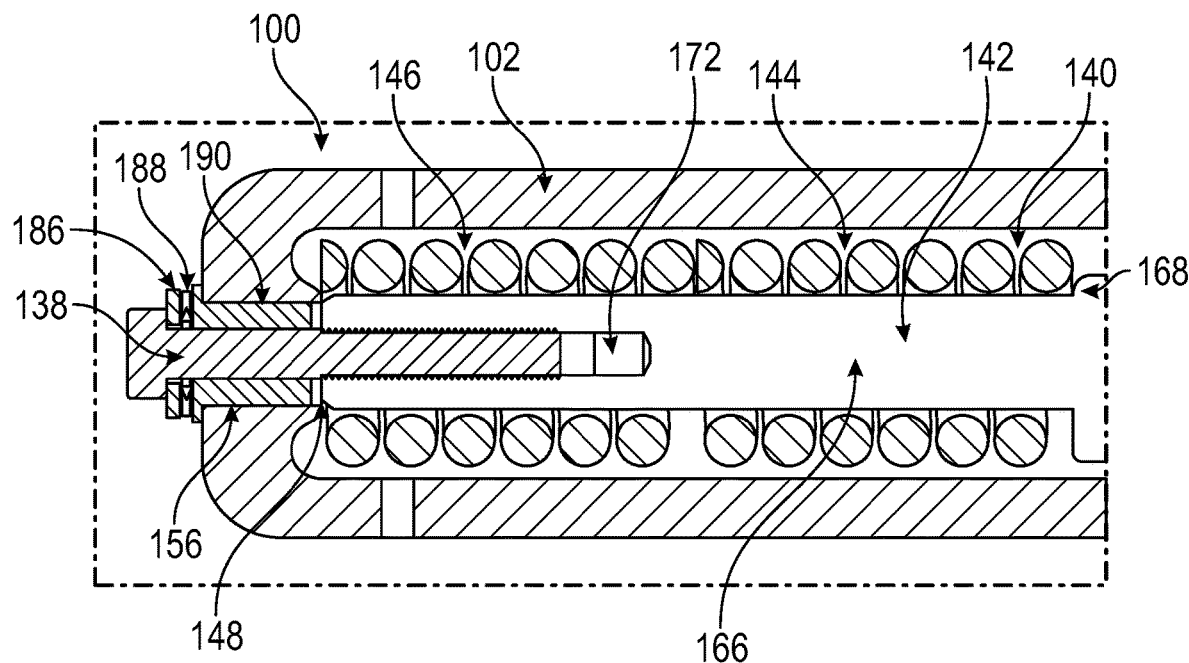
FIG. 8 illustrates a sectioned view of a portion of the cutting device.

FIG. 8 illustrates a section view of a portion of the cutting device 100. As illustrated, the flanged sleeve bearing 190 is positioned within the hole 156 of the housing 102. The arming bolt 138 extends through the flanged sleeve bearing 190 and into the cavity 140 of the housing. The thrust needle roller bearing 188 and washer 186 are disposed between the head of the arming bolt 138 and the flange of the flanged sleeve bearing 190 to facilitate rotation of the arming bolt 138. The arming bolt 138 is extending from outside the housing 102, through the hole 156, and into the hole 172 of the shaft 166 of the cutting tool 142. As described herein, the hole 172 can be threaded such that rotation of the arming bolt 138 within the hole 172 in a first direction moves the cutting tool 142 toward the contact surface 148 and rotation of the arming bolt 138 in a second direction moves the cutting tool 142 away from the contact surface 148. As illustrated, the arming bolt 138 has been rotated to pull the cutting tool 142 such that the shaft 166 of the cutting tool 142 contacts the contact surface 148 and the spring 146 and spring 144 are compressed between the head 168 of the cutting tool 142 and the contact surface 148 of the housing 102. Accordingly, the spring 144 and spring 146 are loaded (e.g., compressed) and apply a force against the head 168 of the cutting tool 142. In some variants, an operator can be notified that the cutting tool 142 has contacted the contact surface 148 by the arming bolt 138 ceasing to rotate or by way of a visual inspection, which can be by way of one of the apertures described herein. In some variants, the operator may rotate the arming bolt 138 to position the cutting tool 142 at a position that is not contacting the contact surface 148, which can result in the spring 144 and/or spring 146 providing a reduced cutting force. In some variants, the spring 144 and/or spring 146 can be compressed or tensioned to varying degrees to provide different cutting forces, which can be modulated to cut cables and the like of varying materials and/or sizes. As described herein, the cutting device 100 may not deploy (e.g., fire) with the arming bolt 138 connected to the cutting tool 142. Accordingly, the lever 112 can lock the cutting tool 142 in position and the arming bolt 138 can be removed without the cutting tool 142 deploying. In some variants, the cutting tool 142 cannot be deployed with the arming bolt 138 gripping the cutting tool 142.

FIGS. 9A and 9B illustrate the lever 112 and related components. As described herein, the lever 112 can be moved in and out of the recess 108 to lock or release the cutting tool 142. The lever 112 can be coupled to the cutting device 100 (e.g., housing 102) with the fastener 110 (e.g., shoulder screw or bolt). The fastener 110 can be positioned through a hole 198 of the lever 112 to secure the lever 112 to the housing 102. The fastener 110 can include a threaded portion 194, which can be screwed into the aperture 162 of the housing 102. The fastener 110 can include a smooth portion 192 around which the lever 112 can be rotated. The lever 112 can be rotated around the fastener 110 between the locked positioned within the recess 108 and unlocked position without the recess 108. A washer 196 can be disposed between the head of the fastener 110 and the housing 102.

The lever 112 can include an arm 200. The arm 200 can be grasped by the operator to rotate the lever 112 between the locked and unlocked configurations. The arm 200 can be a longitudinal portion. As shown in FIGS. 1A and 1B, a link 118 can couple the end of the arm 200 to the housing 102 to retain the lever 112 in the recess 108 and impede deployment of the cutting tool 142. The arm 200 can have a lever aperture 114 positioned on an end thereof and the housing 102 can have a housing aperture 116. The link 118 can be inserted into the lever aperture 114 and housing aperture 116 to prevent the lever 112 from rotating out of the recess 108 to allow the cutting tool 142 to deploy.

Returning to FIGS. 9A and 9B, the lever 112 can include a protrusion 202. The protrusion 202 can extend from a surface of the lever 112 that is opposite the head of the fastener 110. The protrusion 202 can have an oval periphery. The protrusion 202 can have an oval periphery that is curved about a central axis of hole 198. The protrusion 202 can have an oval periphery with a curved inner and outer indent. The curved inner and outer indent can correspond to inner and outer curves of the guide slot 164. The protrusion 202 can have an oval periphery that is curved to move through the guide slot 164 as the lever 112 is rotated.

The protrusion 202 can have a contact point 220 that can contact a portion of the cutting tool 142 to impede deployment. In some variants, the contact point 220 can contact the contact surface 178 of the cutting tool 142 to impede deployment. The lateral distance 218 between the contact point 220 and the central axis of the hole 198 and the distance 222 between the central axis of the hole 198 and the end of the arm 200 can be used to determine the moments (e.g., torques) applied to the lever 112 by the spring 144 and/or spring 146 and the link 118. For example, the spring 144 and/or spring 146 can apply a force against the cutting tool 142 which pushes the cutting tool 142 against the protrusion 202 (e.g., the contact point 220) to generate a first moment (e.g., first torque). The first moment can be calculated by multiplying the distance 218 by the force applied by the spring 144 and/or spring 146. The link 118 positioned at a distance 222 can provide an equal and opposite second moment (e.g., second torque) to prevent the first moment from rotating the lever 112 about the fastener 110 to deploy the cutting tool 142. The second moment can be calculated by multiplying the distance 222 by the reactionary force provided by the link 118. The spring 144, spring 146, and/or link 118 can be selected and/or modified such that the link 118 does not break from the first moment applied by the spring 144 and/or spring 146. In some variants, the distance 218 and/or distance 222 can be altered to reduce and/or increase the first and/or second moments. The ratio of the distance 218 and/or distance 222 can determine the amount of force that can be applied by the lever aperture 114 and/or spring 146 without prematurely breaking the link 118 and/or the kind of link 118 that can be used.

Figure 10A:
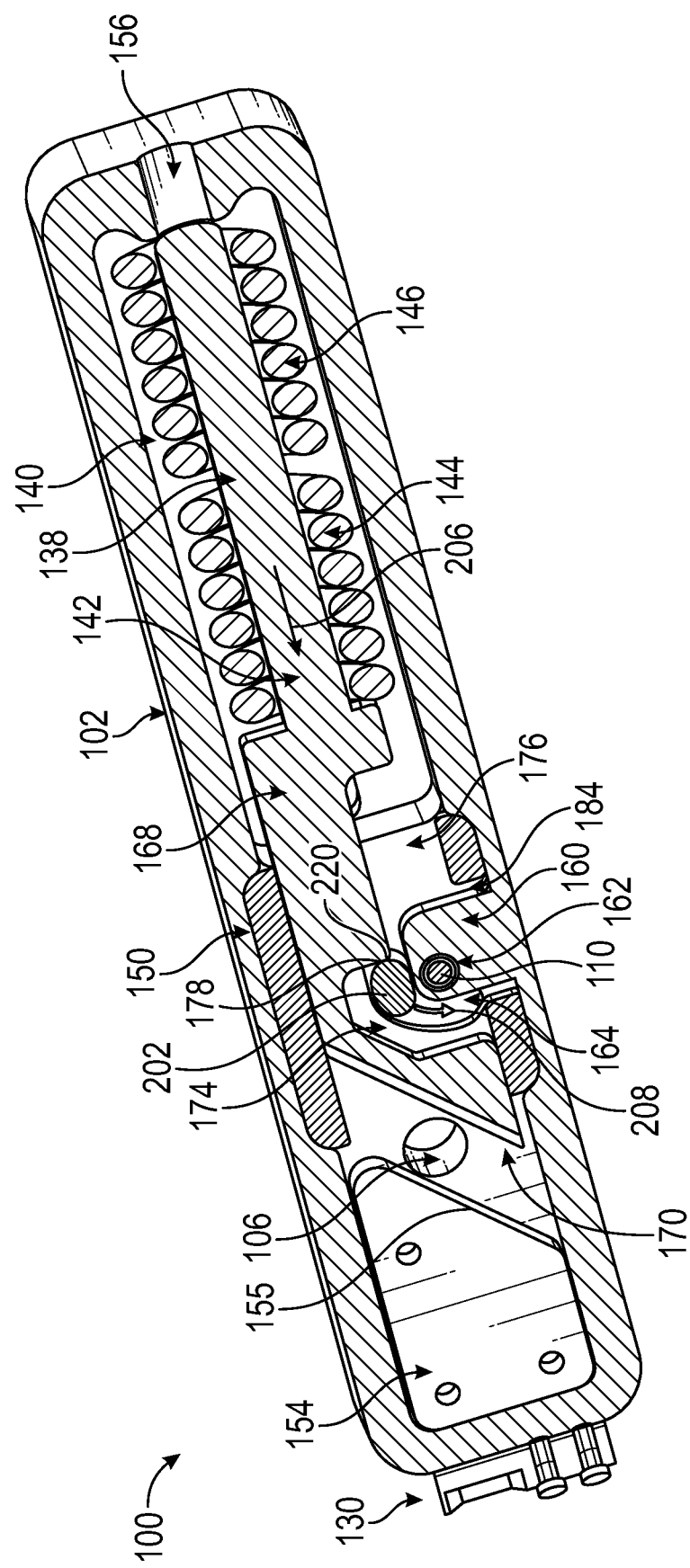
FIG. 10A illustrates a section view of the cutting device in an armed configuration.

FIG. 10A illustrates a section view of the cutting device 100 in an armed configuration. The arming bolt 138 has been removed, leaving the lever 112 to impede deployment of the cutting tool 142. As illustrated, the lever 112 is rotated into the recess 108 such that the lever 112 contacts the cutting tool 142. As described herein, the protrusion 202 extends through the guide slot 164 such that the contact point 220 of the protrusion 202 contacts the contact surface 178 of the cutting tool 142. The cutting tool 142 and/or spring 146, previously loaded by the arming bolt 138, apply a force against the cutting tool 142 in the direction of arrow 206, urging the cutting tool 142 to move in the direction of arrow 206 to cut a cable or the like positioned in the hole 106. The contact between the lever 112 (e.g., the protrusion 202) and the cutting tool 142 impedes deployment of the cutting tool 142 in the direction of arrow 206. The cutting tool 142 applies a force against the protrusion 202, urging the lever 112 to pivot about fastener 110 such that the protrusion 202 moves in the direction of arrow 208 within the guide slot 164. The load applied by the cutting tool 142 against the lever 112 (e.g., the contact point 220 of the protrusion 202) can be in line with the shaft 166 of the cutting tool 142 to translate the cutting tool 142 straight (e.g., avoid deviating sideways, binding, etc.). As described herein, the link 118 can couple the lever 112 (e.g., arm 200) to the housing 102 to prevent the lever 112 from rotating out of the recess 108 and the protrusion 202 from moving in the direction of arrow 208 and out of the direction of movement of the cutting tool 142.

Figure 10B:
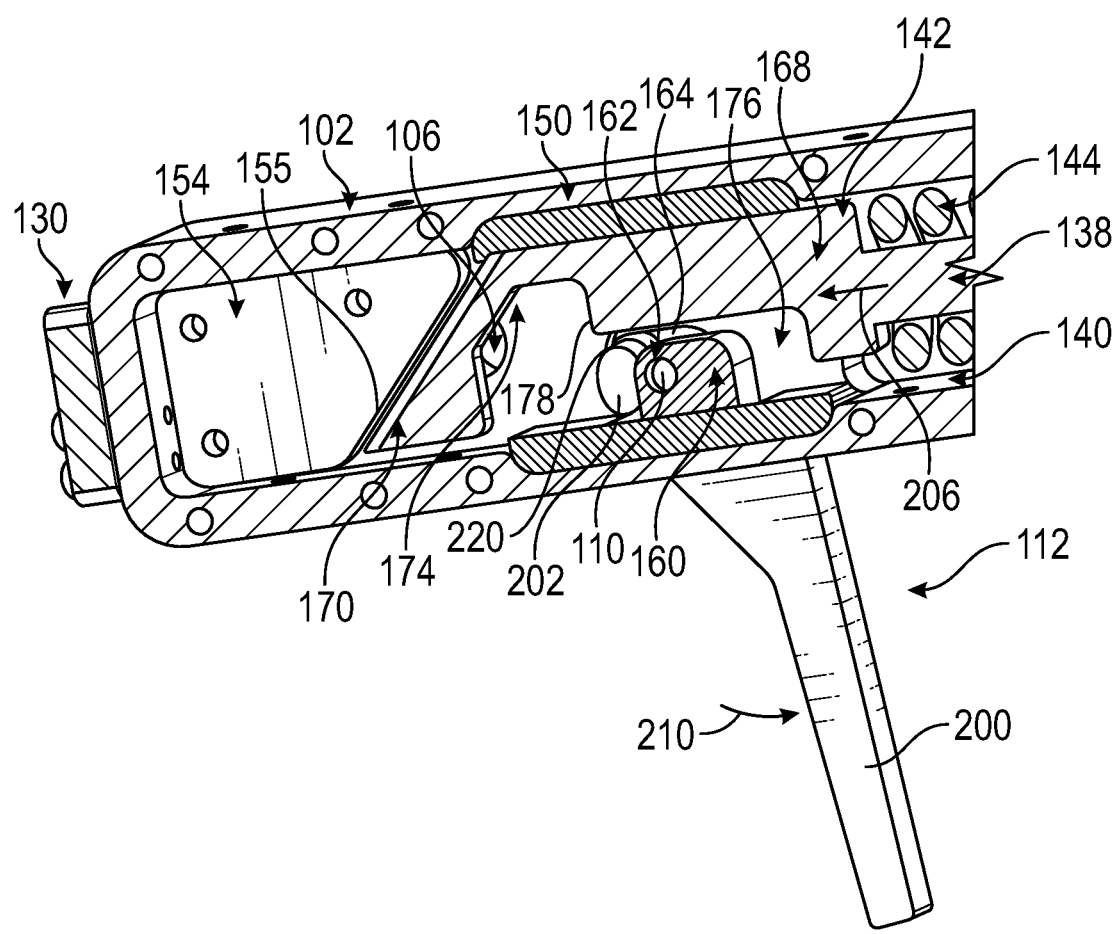
FIG. 10B illustrates a section view of a portion of the cutting device in a deployed configuration.
Figure 10C:
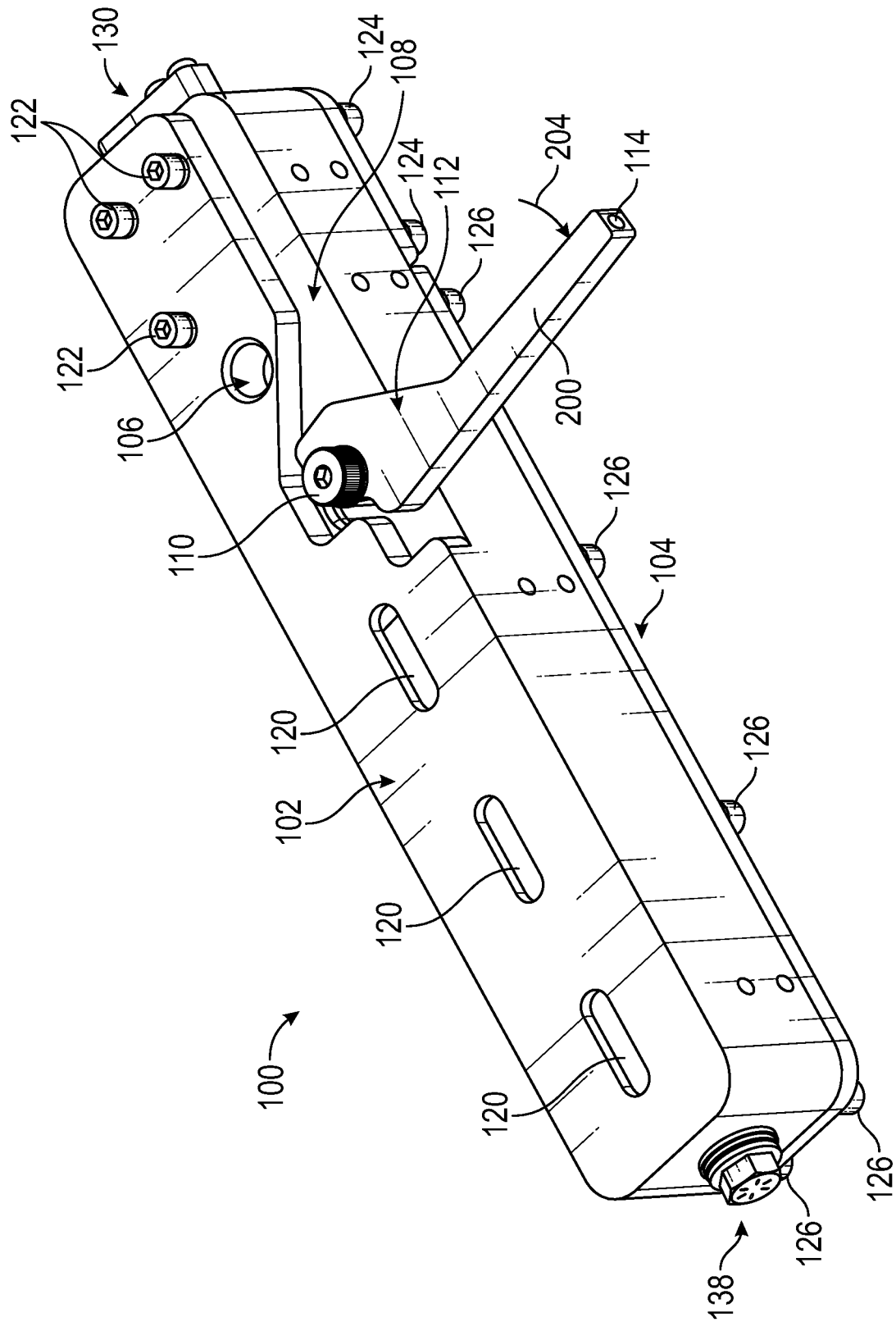
FIG. 10C illustrates the cutting device in a deployed configuration.

The link 118 can be removed, broken, corroded, disintegrated, melted, and/or otherwise compromised to allow the lever 112 to be rotated by the force applied thereto by the cutting tool 142. As illustrated in FIG. 10B, the link 118 was compromised such that the lever 112 was rotated out of the recess 108 in the direction of arrow 210 by the deployment of the cutting tool 142 by the spring 144 and/or spring 146. The cutting tool 142 moving in the direction of arrow 206 moved the protrusion 202 within the guide slot 164 such that the cutting edge 170 of the cutting tool 142 passed over the hole 106 and/or into the stop block 154, cutting the cable or the like positioned through the hole 106. As described herein, the head 168 of the cutting tool 142 can move within the guide block 150 to facilitate smooth translation of the cutting tool 142 to cut the cable or the like. As described herein, the cutting edge 170 can move into the stop block 154, which can break the stop block 154. FIG. 10C illustrates the arm 200 of the lever 112 rotated out of the recess 108, indicating that the cutting tool 142 has deployed. The cutting device 100 can be operational at any depth of water (e.g., the operation of the cutting device 100 is not depth dependent) or altitude.

Figure 11:
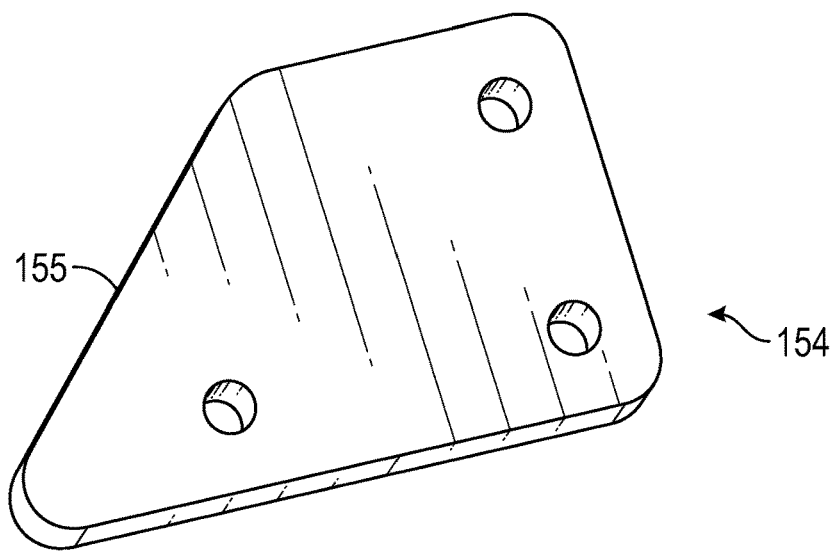
FIG. 11 illustrates an example stop block.

FIG. 11 illustrates the stop block 154, which can also be referred to as a backstop. As described herein, the stop block 154 can have an angled edge 155, which can correspond to the cutting edge 170. The angled edge 155 can have an angle the same as or similar to the angled edge 155. The cutting edge 170 of the cutting tool 142, when deployed, can hit the angled edge 155, which can result in the breaking of the stop block 154. The stop block 154 can be positioned on an opposing side of the hole 106 relative to the cutting tool 142. The stop block 154 can be made of a polymer, such as plastic, and/or another material (e.g., fiberglass).

Figure 12A:
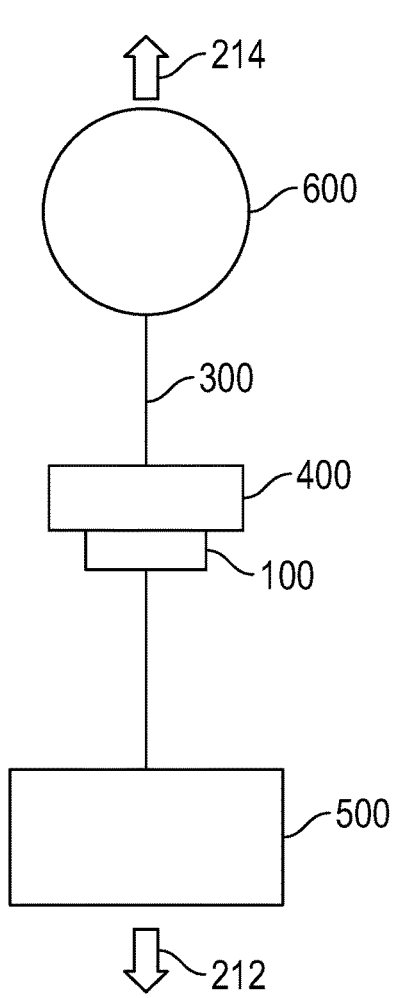
FIGS. 12A and 12B illustrate the cutting device applied in an underwater application in which a cable is severed to release one or more items to float to the ocean surface.
Figure 12B:
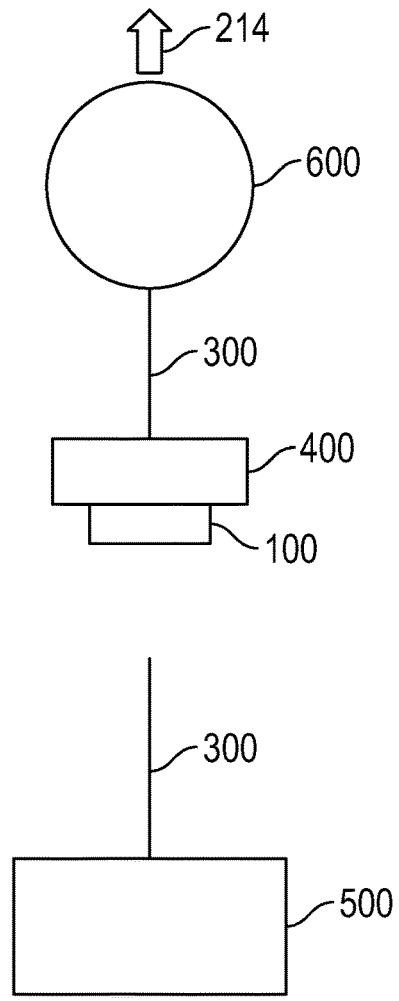

FIGS. 12A and 12B illustrate a weight 500 (e.g., anchor) coupled to a cable 300 retaining one or more items 400, cutting device 100, and float 600 proximate the ocean floor or suspended at a depth in the ocean. The float 600 can provide an upward buoyant force in the direction of arrow 214 while the weight 500, one or more items 400, and/or cutting device 100 can supply an equal or greater force in the direction of arrow 212. It can be difficult to retrieve the one or more items 400 positioned underwater. Accordingly, the cutting device 100 can be used by an operator to remotely sever the cable 300 securing the float 600, one or more items 400, and/or cutting device 100 to the weight 500 to allow the float 600 to pull the one or more items 400 and/or cutting device 100 to the ocean surface. As illustrated in FIG. 12B, the cutting device 100 can be actuated to deploy the cutting tool 142 to sever the cable 300 to the weight 500 such that the float 600, one or more items 400, and/or cutting device 100 are free to float to the ocean surface from the upward buoyant force of the float 600 in the direction of arrow 214. In some variants, no weight 500 is used. As described herein, in some variants, the cutting device 100 can fire upon reaching a particular depth of water, severing the cable 300 to allow the float 600 to float the one or more items 400 to the surface before the one or more items 400 and/or other components implodes from excessive pressure.

Figure 13:
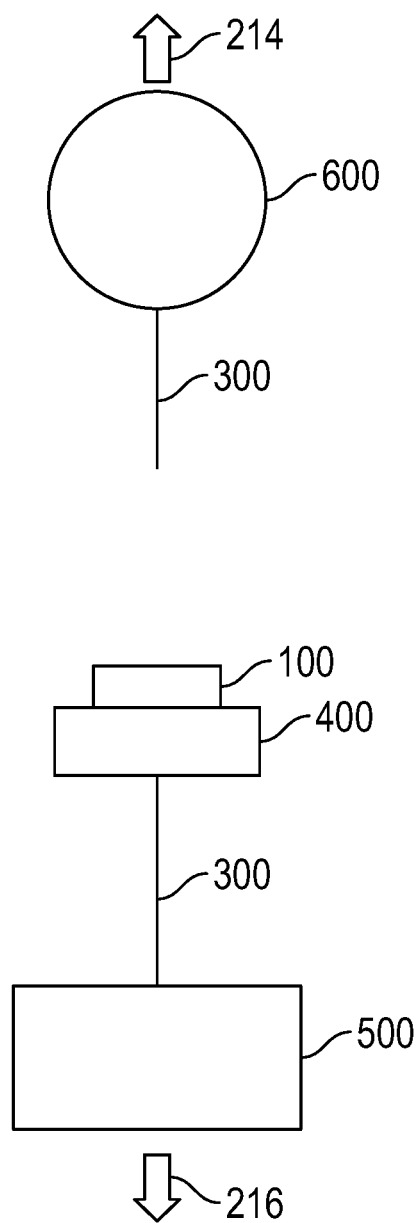
FIG. 13 illustrate the cutting device applied in an underwater application in which a cable is severed to release the one or more items to descend to the ocean floor.

In some scenarios, it may be desirable to not retrieve the one or more items 400 and prevent others from accessing the one or more items 400. In such scenarios, the float 600 and the weight 500, one or more items 400, and/or cutting device 100 may apply equal and opposite forces, suspending the one or more items 400 (e.g., data recorder, surveillance technology, etc.) at a depth in the ocean. When desired, the cutting device 100 can be actuated to deploy the cutting tool 142 such that the cable 300 securing the cutting device 100, one or more items 400, and/or weight 500 to the float 600 can be severed, allowing the weight 500, cutting device 100, and/or one or more items 400 to sink to the ocean floor to prevent retrieval. In some variants, a weight 500 may not be used and the weight of the cutting device 100 and/or one or more items 400 is sufficient. In some variants, the examples described in reference to FIGS. 12A-13 can similarly be utilized in other environments, such as in the air.

The cutting device 100 can be utilized in many scenarios. For example, a cargo plane may retain cargo using a cable. A system to release the cable from securing the cargo may fail. Accordingly, the cutting device 100 can be used to cut the cable to release the cargo in the event of an emergency. In another example, a cable can secure one or more cars before a race. The cable can be severed to release the cars at the same moment to ensure an equal start. In another example, a tow truck may utilize a cable to tow one or more cars. In some scenarios, it may be desirable to sever the cable in the event of an emergency. Accordingly, the cutting device 100 can be used to cut the cable to release the one or more cars. In another example, a boat may pull a participant of a watersport (e.g., water skiing, wake boarding, wake surfing, tubing, etc.) with a cable or the like. In an emergency, the cutting device 100 may be used to sever the cable or the like to release the participant. In another example, the cutting device 100 may be used to cut the power and/or data cable inside of an electric vehicle to cut off power being supplied from a battery to one or more other electrical components within the electric vehicle (e.g., the motor, headlights, suspension system, navigation system, communications system, etc.), which may be desirable in the event of an emergency to prevent fire, electric shock, or other similar hazards. In another example, the cutting device 100 may be used to cut a data cable or fiber, which may be positioned deep within the ocean. For example, ocean pressures may push two connectors of a data cable together such that the connectors cannot readily be disconnected. Accordingly, the data cable may be cut by the cutting device 100. Actuation of the cutting device 100 in any of these scenarios can be accomplished using the techniques described herein. In addition, in the scenarios above in which the cutting device 100 is used for emergency purposes, actuation of the cutting device 100 can occur in response to a signal (e.g., an electrical signal) being received by the cutting device 100 from a sensor that detects a force exceeding a threshold force (e.g., in newtons) and/or that detects a force exceeding a threshold force that is in a direction different than a direction of travel of a vehicle, in response to a signal (e.g., an electrical signal) being received from another component within the vehicle indicating that a safety mechanism has been deployed (e.g., airbags, a fire alarm, emergency lighting, an emergency transmission, etc.), in response to a button, switch, lever, or other type of actuator being engaged by an operator (e.g., a pilot, a captain, a driver, a passenger, etc.), and/or the like.

The cutting device 100 and the components thereof can be made of a variety of materials, which can include metals (e.g., aluminum, anodized aluminum, steel, stainless steel, titanium, etc.), metal alloys, polymers (e.g., plastics), ceramics, composites (e.g., carbon fiber), and/or others. The cutting device 100 can have different life expectancies (e.g., 5, 10, 20, 30, 40, 50, 100 or more years), which can vary based on the material selected. The cutting device 100 and components thereof can be manufactured using a variety of techniques, which can include casting, machining, 3D printing, and/or others.

Figure 14:
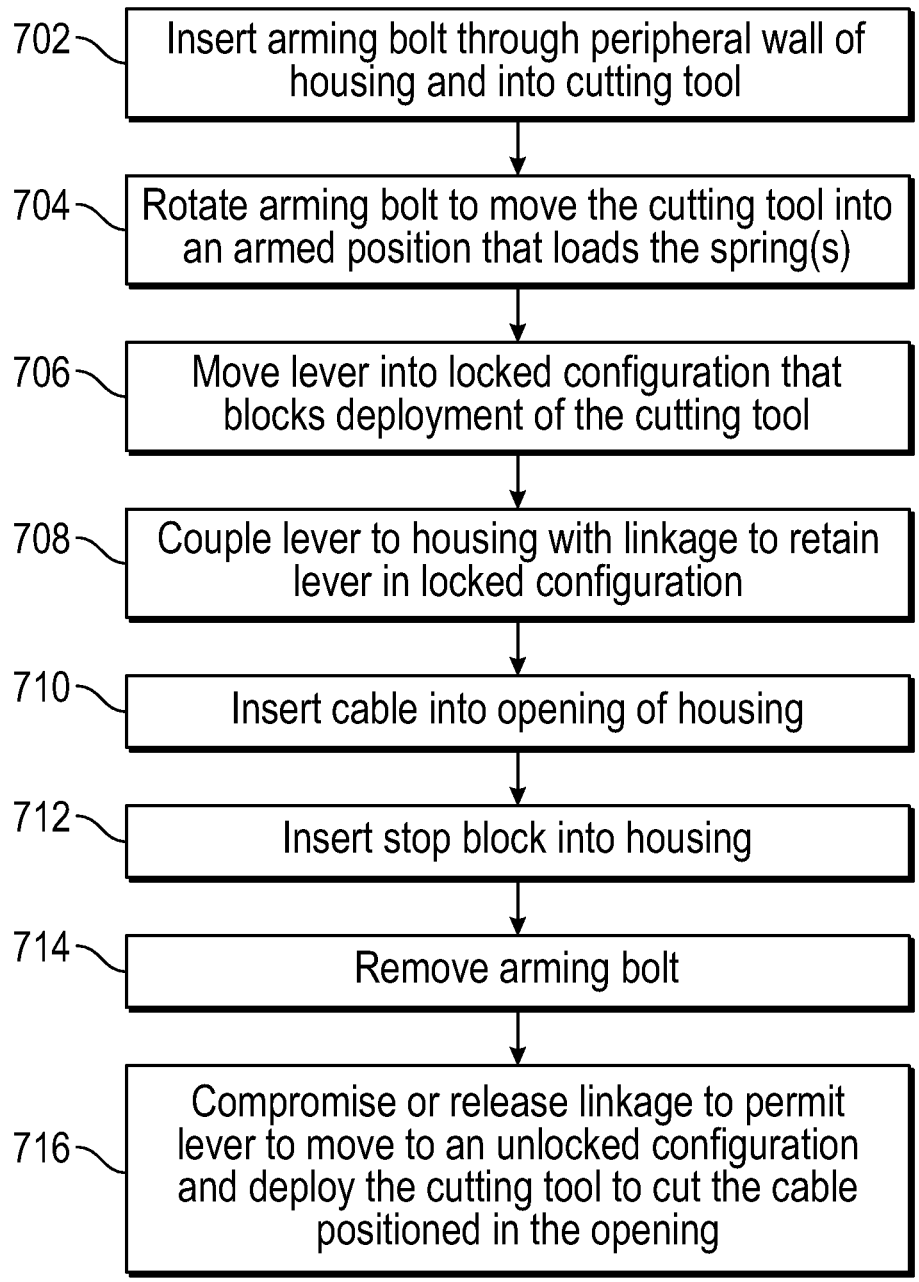
FIG. 14 illustrates an example of a method for arming and deploying an arming device.

FIG. 14 is a flow diagram depicting an example method 700 of arming and deploying the cutting device 100. The flow diagram is provided for the purpose of facilitating description of aspects of some embodiments. The diagram does not attempt to illustrate all aspects of the disclosure and should not be considered limiting. The order of the one or more steps described in reference to method 700 can be reordered and/or one or more steps can be omitted.

At block 702, the operator can insert the arming bolt 138 through the peripheral wall of the housing 102 and into the cutting tool 142. For example, the operator can insert the arming bolt 138 through the hole 156 of the housing 102 and into the hole 172 of the shaft 166 of the cutting tool 142. The arming bolt 138 and the hole 172 can be threaded to facilitate a threaded connection.

At block 704, the operator can rotate the arming bolt 138 to move the cutting tool 142 into an armed position that loads the spring 144 and/or spring 146. For example, the operator can rotate the arming bolt 138 to pull or push the cutting tool 142 toward a contact surface 148 until the shaft 166 of the cutting tool 142 contacts the contact surface 148. In some variants, the spring 144 and/or spring 146 can be compressed between a head 168 of the cutting tool 142 and the contact surface 148 to load the spring 144 and/or spring 146. In some variants, the spring 144 and/or spring 146 can be pulled into tension by the movement of the cutting tool 142, loading the spring 144 and/or spring 146. The guide block 150 can prevent the cutting tool 142 from rotating during arming of the cutting device 100.

At block 706, the lever 112 can be moved into a locked configuration (e.g., within the recess 108) that blocks deployment of the cutting tool 142. In some variants, the lever 112 can be rotated such that a contact point 220 of the protrusion 202 of the lever 112 contacts the contact surface 178 of the cutting tool 142 to impede movement of the cutting tool 142. The protrusion 202 of the lever 112 can move through the guide slot 164 of the housing 102. The lever 112 can be rotated around a fastener 110 (e.g., pivot). In some variants, as described herein, the lever 112 can be rotated around a protrusion (e.g., cylinder) extending from the housing 102 instead of a lever 112.

At block 708, the operator and/or an automated system can couple the lever 112 to the housing 102 with a linkage 118 (e.g., link, fastener, clamp, etc.) to retain the lever 112 in the locked configuration. The linkage 118 can couple an end of the lever 112 (e.g., an end of the arm 200) to the housing 102, which can balance the moments being exerted on the lever 112 as described herein. The linkage 118 can be inserted into a housing aperture 116 of the housing 102 and an lever aperture 114 of the lever 112 to secure the lever 112 in the locked configuration.

At block 710, an operator can insert a cable or the like into the opening 106 of the housing 102. In some variants, the cable or the like can be inserted into the opening 106 after coupling the lever 112 to the housing 102 with a linkage 118 to retain the lever 112 in the locked configuration, as described in reference to block 710.

At block 712, an operator can insert the stop block 154 into the housing 102. In some variants, the stop block 154 can be inserted into the recess 158. The stop block 154 can be secured in place with the bolts 103, as described herein.

At block 714, the arming bolt 138 can be removed. In some variants, the arming bolt 138 can be unscrewed from the cutting tool 142 and removed from the housing 102.

At block 716, the link 118 can be released, broken, and/or otherwise compromised, by at least the methods described herein (e.g., corrosion by the application of an electrical current, etc.), to permit the lever 112 to move to an unlocked configuration (e.g., rotated out of the recess 108 of the housing 102) such that the cutting tool 142 can deploy toward the opening 106 of the housing 102 to cut the cable or the like positioned therein. The contact surface 178 of the cutting tool 142 can apply a force (e.g., push) against the contact point 220 of the protrusion 202 such that the protrusion 202 moves within the guide slot 164 to move to a position that does not impede the deployment of the cutting tool 142. The cutting tool 142 can pass over the opening 106 to sever the cable or the like therein. In some variants, the cutting tool 142 can advance into a stop block 154, which can break the stop block 154 upon impact. The stop block 154 can be replaced upon breaking. In some variants, the cutting tool 142 can be used through multiple arming and deployment cycles. In some variants, the cutting tool 142 can be replaced as needed. The guide block 150 can facilitate sliding of the cutting tool 142 to deploy and/or impede rotation of the cutting tool 142 during deployment.

Terminology

All of the methods and tasks described herein may be performed and fully automated by a computer system. The computer system may, in some cases, include multiple distinct computers or computing devices (for example, physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (for example, solid state storage devices, disk drives, etc.). The various functions disclosed herein may be embodied in such program instructions, or may be implemented in application-specific circuitry (for example, ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (for example, not all described operations or events are necessary for the practice of the algorithm). Moreover, in certain embodiments, operations or events can be performed concurrently, for example, through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (for example, ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," "for example," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A device configured to sever a cable, the device comprising:
   a housing having a peripheral wall and a hole that is configured to receive the cable therethrough;
   a cutting tool disposed in the housing, the cutting tool comprising a shaft and a head having a cutting edge configured to sever the cable;
   one or more springs disposed around the shaft,
   a bolt configured to extend through the peripheral wall of the housing and into the shaft of the cutting tool to arm the device, wherein the bolt is configured to be rotated to pull the cutting tool to compress the one or more springs between the peripheral wall and the head of the cutting tool;
   a lever configured to be moved between a locked configuration and an unlocked configuration, the lever configured to block movement of the cutting tool toward the hole in the locked configuration and configured to permit movement of the cutting tool toward the hole in the unlocked configuration; and
   a link configured to couple the lever to the housing to secure the lever in the locked configuration, wherein the link is configured to be compromised to allow the lever to be moved to the unlocked configuration to permit the cutting tool to move toward the hole.

2. The device of claim 1, comprising a guide block disposed in the housing, the guide block having a central slot configured to receive at least the head of the cutting tool, wherein the guide block is configured to facilitate sliding of the cutting tool during deployment and arming.

3. The device of claim 1, comprising a stop block disposed in the housing on an opposing side of the hole relative to the cutting tool, wherein the cutting tool is configured to deploy over the hole and into the stop block.

4. The device of claim 3, wherein the cutting edge is angled and corresponds to an angled edge of the stop block.

5. The device of claim 1, wherein the cutting edge is angled.

6. The device of claim 1, wherein the one or more springs are helical springs with closed and ground ends.

7. The device of claim 1, wherein the lever is coupled to the housing with a fastener and pivots about the fastener between the locked and unlocked configurations.

8. The device of claim 1, wherein the lever comprises a protrusion configured to contact the cutting tool to block movement of the cutting tool toward the hole.

9. The device of claim 8, wherein the protrusion is configured to contact the cutting tool at a contact point that is aligned with a central axis of the shaft.

10. The device of claim 9, wherein the lever is configured to rotate about a pivot that is a first distance away from the protrusion, and wherein the one or more springs are configured to push the cutting tool against the protrusion at the contact point to generate a first torque.

11. The device of claim 10, wherein the link is configured to couple the lever to the housing at a location that is a second distance away from the pivot to generate a second torque that is equal and opposite to the first torque to prevent the lever from rotating from the locked configuration to the unlocked configuration.

12. The device of claim 8, wherein the housing comprises a guide slot configured to receive the protrusion therein such that the protrusion moves through the guide slot as the lever is rotated between the locked and unlocked configurations.

13. A cutting device configured to sever a cable, the cutting device comprising:
   a housing having an opening configured to receive the cable therein;
   a cutting tool disposed in the housing, the cutting tool comprising a cutting edge that is configured to cut the cable received in the opening;
   one or more springs configured to apply a force to the cutting tool such that the cutting tool deploys toward the opening to cut the cable;
   a bolt configured to extend through the housing and into the cutting tool such that rotation of the bolt moves the cutting tool to load the one or more springs;
   an arm configured to be moved between locked and unlocked configurations, the arm configured to block deployment of the cutting tool toward the opening in the locked configuration and permit deployment of the cutting tool toward the opening in the unlocked configuration; and a linkage configured to retain the arm in the locked configuration;

wherein the linkage is configured to release the arm to allow the arm to be moved to the unlocked configuration to permit the cutting tool to move toward the opening.

14. The cutting device of claim 13, further comprising a backstop block disposed in the housing on an opposing side of the opening relative to the cutting tool, wherein the cutting tool is configured to deploy over the opening and into the backstop block.

15. The cutting device of claim 13, wherein the cutting tool comprises a shaft, and wherein the one or more springs is disposed around the shaft.

16. The cutting device of claim 13, wherein the arm comprises a protrusion configured to contact the cutting tool to block movement of the cutting tool toward the opening.

17. The cutting device of claim 16, wherein the protrusion is configured to contact the cutting tool at a contact point that is aligned with a central axis of the cutting edge.

18. The cutting device of claim 17, wherein the arm is configured to rotate about a pivot that is a first distance away from the protrusion, and wherein the one or more springs are configured to push the cutting tool against the protrusion at the contact point to generate a first torque.

19. The cutting device of claim 18, wherein the linkage is configured to couple the arm to the housing at a location that is a second distance away from the pivot to generate a second torque that is equal and opposite to the first torque to prevent the arm from rotation from the locked configuration to the unlocked configuration.

20. A cutting device configured to sever a cable, the cutting device comprising:

a housing having an opening configured to receive the cable therein;

a cutting tool disposed in the housing that is configured to cut the cable received in the opening;

one or more springs configured to apply a spring force to the cutting tool such that the cutting tool deploys toward the opening to cut the cable;

an arming mechanism configured to compress or tension the one or more springs;

a locking mechanism configured to be manipulated between a locked and unlocked configuration, the locking mechanism configured to block deployment of the cutting tool toward the opening in the locked configuration and permit deployment of the cutting tool toward the opening in the unlocked configuration; and a linkage configured to retain the locking mechanism in the locked configuration;

wherein the linkage is configured to release the locking mechanism to permit the one or more springs to apply the spring force to the cutting tool to move the cutting tool toward the opening.

21. The cutting device of claim 20, wherein the housing comprises one or more apertures to permit water flow in and out of an interior of the housing with the cutting device submerged in water, and wherein the one or more springs and cutting tool are disposed in the interior.

* * * * *